United States Patent
Saito et al.

(10) Patent No.: US 7,028,109 B2
(45) Date of Patent: Apr. 11, 2006

(54) DATA TRANSFER CONTROL DEVICE INCLUDING BUFFER CONTROLLER WITH PLURALITY OF PIPE REGIONS ALLOCATED TO PLURALITY OF ENDPOINTS

(75) Inventors: Nobuyuki Saito, Sapporo (JP);
Shinsuke Kubota, Sapporo (JP);
Hiroaki Shimono, Sapporo (JP);
Kuniaki Matsuda, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 392 days.

(21) Appl. No.: 10/377,763

(22) Filed: Mar. 4, 2003

(65) Prior Publication Data

US 2003/0229749 A1 Dec. 11, 2003

(30) Foreign Application Priority Data

Apr. 19, 2002 (JP) .............................. 2002-118206

(51) Int. Cl.
*G06F 3/00* (2006.01)
(52) U.S. Cl. .............................. 710/33; 710/5; 710/52; 710/53; 710/104; 710/109
(58) Field of Classification Search .................... 710/5, 710/52, 53, 33, 104, 109
See application file for complete search history.

(56) References Cited

U.S. PATENT DOCUMENTS 5,974,486 A * 10/1999 Siddappa ..................... 710/53
6,070,208 A * 5/2000 Brief .......................... 710/104
6,105,097 A    8/2000 Larky et al.
6,718,412 B1 * 4/2004 Purcell et al. ............... 710/109

FOREIGN PATENT DOCUMENTS

| JP | A 10-301898 | 11/1998 |
|----|-------------|---------|
| JP | A 2002-9849 | 1/2002 |
| JP | A 2002-55936 | 2/2002 |
| JP | A 2002-91717 | 3/2002 |
| JP | A 2002-116998 | 4/2002 |

OTHER PUBLICATIONS

"USB On-The-Go: A Tutorial", Philips Semiconductors, Jan. 2002.*
Nobuyuki Saito; "OTG Controller LSI Taking Reduction of CPU Load Into Consideration"; Design Wave Magazine; Apr. 2002; pp82-88 and 166 w/translation.
U.S. Appl. No. 10/377,764, filed Mar. 4, 2003, Saito et al.

(Continued)

Primary Examiner—Tammara Peyton
(74) Attorney, Agent, or Firm—Oliff & Berridge PLC

(57) ABSTRACT

A plurality of pipe regions PIPE0 to PIPEe in which data transferred to and from endpoints is stored are allocated in a packet buffer (FIFO). Transfer condition information on data transfer between the pipe regions and the endpoints is set in transfer condition registers TREG0 to TREGe in a register section. A host (transfer) controller automatically generates a transaction for each of the endpoints based on the transfer condition information (total size, maximum packet size, transfer direction, number of continuous execution times, token issue interval, and the like) set in the transfer condition registers, and automatically transfers data between each pipe region and the endpoint. An OTG (state) controller which controls a state of USB On-The-Go is provided. The pipe regions are allocated in the packet buffer during a host operation.

20 Claims, 26 Drawing Sheets

OTHER PUBLICATIONS

U.S. Appl. No. 10/377,632, filed Mar. 4, 2003, Saito et al.
U.S. Appl. No. 10/377,673, filed Mar. 4, 2003, Saito et al.
U.S. Appl. No. 10/377,765, filed Mar. 4, 2003, Saito et al.
U.S. Appl. No. 10/369,630, filed Feb. 21, 2003, Saito et al.
Wu, "USB On-The-Go Implementation," pp. 1-25, Nov. 9, 2001.

* cited by examiner

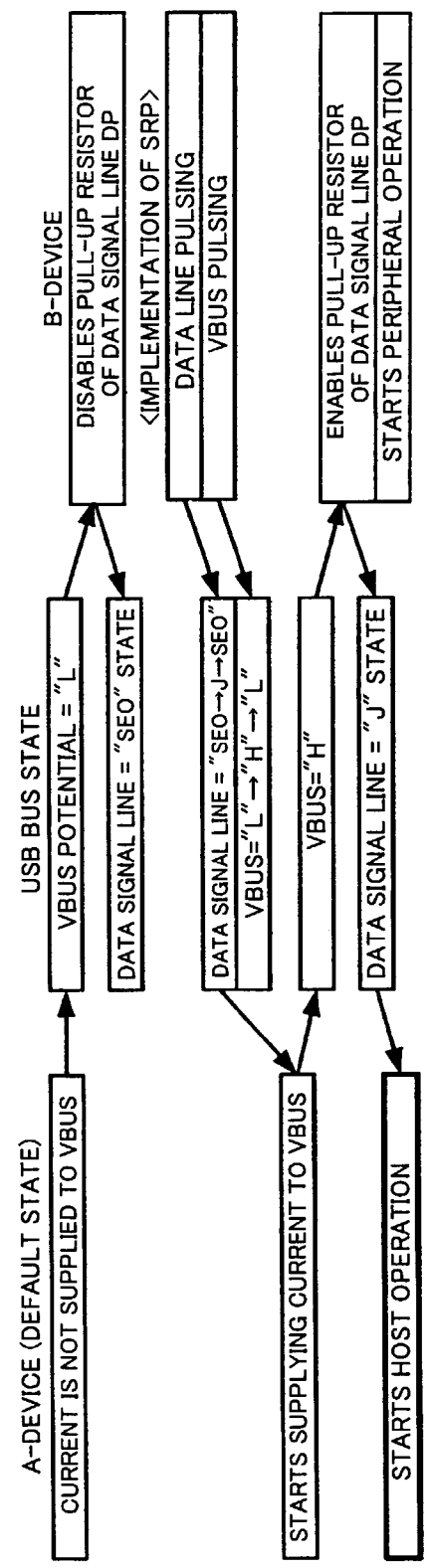
FIG. 2A  SRP (SESSION REQUEST PROTOCOL)
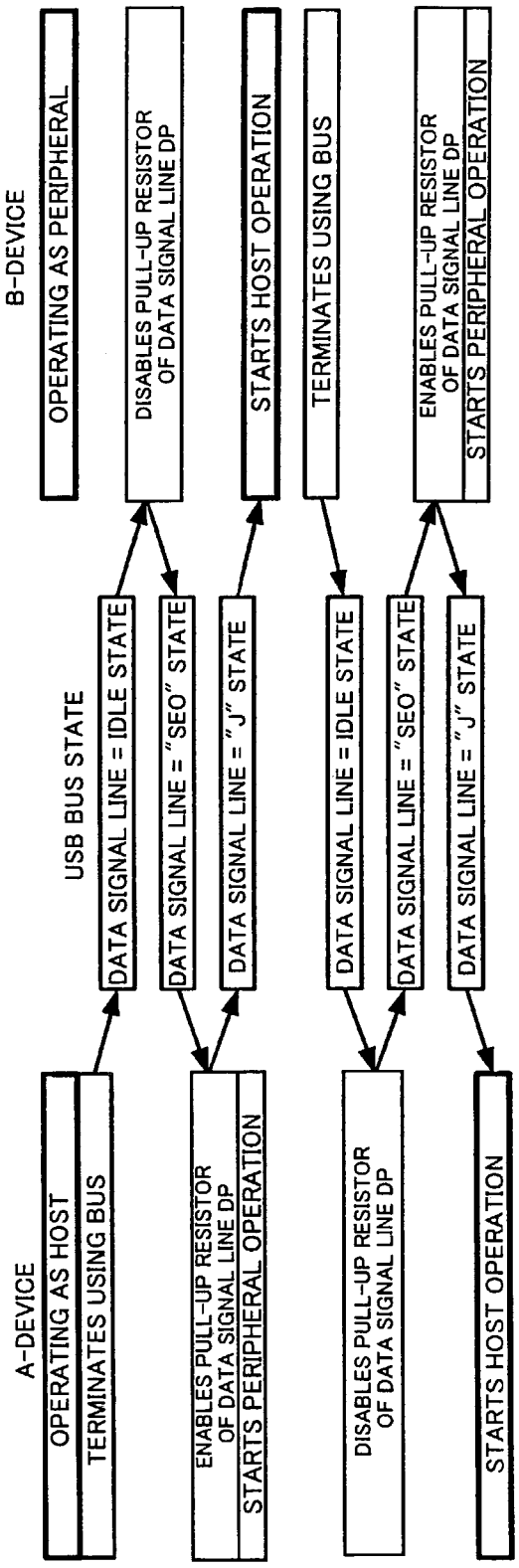
FIG. 2B  HNP (HOST NEGOTIATION PROTOCOL)

LIST STRUCTURE TYPE DESCRIPTOR

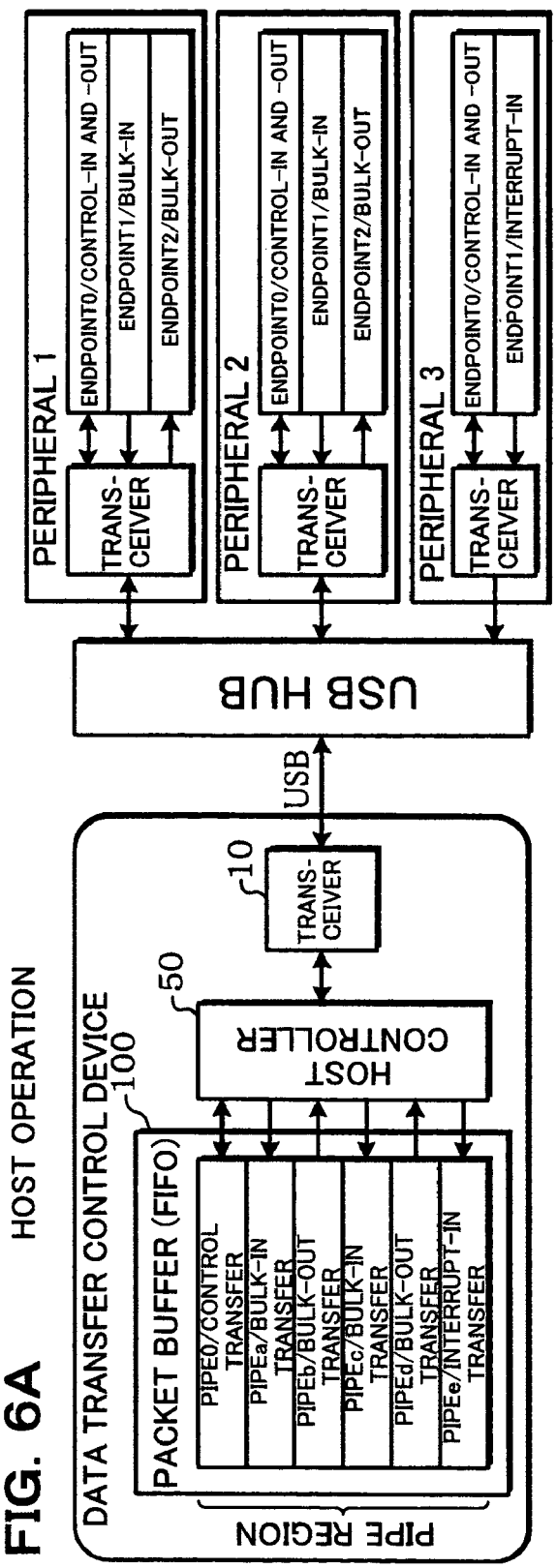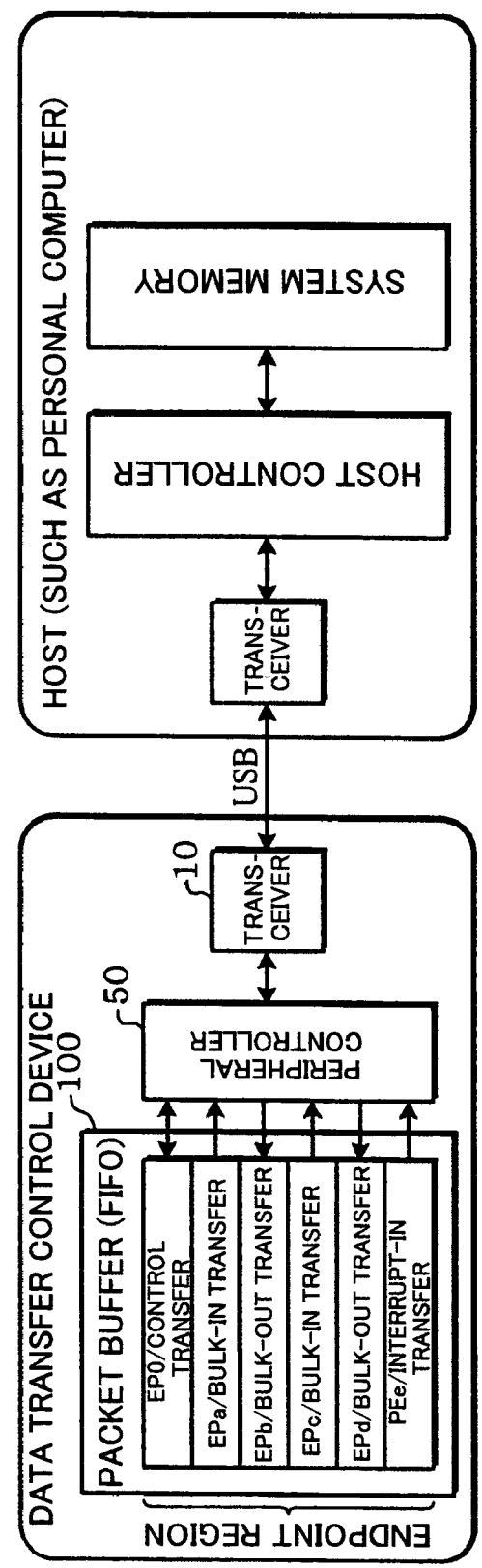

DURING HOST OPERATION

DURING PERIPHERAL OPERATION

FIG. 9

REGISTER SECTION

| | | | |
|---|---|---|---|
| TRANSFER CONDITION REGISTER (PIPE/EP CONTROL REGISTER) (0, a~e) | HC/PC (PIPE/EP) COMMON REGISTER | REGISTER USED COMMONLY DURING HOST OPERATION (PIPE) AND PERIPHERAL OPERATION (EP) | DATA TRANSFER DIRECTION, TRANSFER TYPE, ENDPOINT NUMBER, MAXIMUM PACKET SIZE, PAGE NUMBER, USE OF DMA CONNECTION, ETC. |
| | HC (PIPE) REGISTER | REGISTER USED ONLY DURING HOST OPERATION (PIPE) | TOKEN ISSUE INTERVAL FOR INTERRUPT TRANSFER, NUMBER OF CONTINUOUS EXECUTION TIMES OF TRANSACTIONS, FUNCTION ADDRESS, TOTAL SIZE OF TRANSFER DATA, START INSTRUCTION FOR AUTOMATIC TRANSACTION, INSTRUCTION FOR AUTOMATIC CONTROL TRANSFER MODE, ETC. |
| | PC (EP) REGISTER | REGISTER USED ONLY DURING PERIPHERAL OPERATION (EP) | ENDPOINT ENABLE, HANDSHAKE DESIGNATION, ETC. |
| | COMMON ACCESS CONTROL REGISTER FOR PACKET BUFFER (FIFO) | REGISTER FOR CONTROLLING ACCESS TO PACKET BUFFER (FIFO) | BUFFER I/O PORT, BUFFER FULL/EMPTY, BUFFER REMAINING DATA SIZE, ETC. |
| INTERRUPT-RELATED REGISTER | INTERRUPT STATUS REGISTER | REGISTER WHICH INDICATES STATUS (FACTOR) OF INTERRUPT | OTGC, HC (PIPE), PC (EP), ETC. |
| | INTERRUPT ENABLE REGISTER | REGISTER FOR SETTING ENABLING/DISABLING OF INTERRUPT | OTGC, HC (PIPE), PC (EP), ETC. |
| BLOCK-RELATED REGISTER | INTERBLOCK COMMON REGISTER | REGISTER USED COMMONLY BY BLOCKS | INSTRUCTION OF BLOCK RESET, ETC. |
| | BLOCK REGISTER | REGISTER USED IN EACH OF BLOCKS (Xcvr, OTGC, HC, PC) | Xcvr CONTROL, OTGC STATE COMMAND, HC STATE COMMAND, FRAME NUMBER, ETC. |
| DMA CONTROL REGISTER | — | REGISTER FOR SETTING DMA TRANSFER | START DMA TRANSFER, TOTAL SIZE OF DMA TRANSFER DATA, ETC. |

FIG. 10

GENERAL-PURPOSE TRANSFER CONDITION (PIPE/EP) REGISTER

| | Addr | Register Name | bit7 | bit6 | bit5 | bit4 | bit3 | bit2 | bit1 | bit0 |
|---|---|---|---|---|---|---|---|---|---|---|
| HC/PC (PIPE/EP) COMMON REGISTER | 0x0 | xConfig_0 | JoinDMA | FIFOClr | ToggleMode | AutoZeroLen | | BufferPage[3:0] | | |
| | 0x1 | xConfig_1 | DirPID[1:0] | | TranType[1:0] | | | EPNumber[3:0] | | |
| | 0x2 | xMaxPktSize_H | | | | | | | | MaxPktSize[9:8] |
| | 0x3 | xMaxPktSize_L | | | | MaxPktSize[7:0] | | | | |
| HC (PIPE) REGISTER | 0x4 | PIPExInterval | | | | Interval[7:0] | | | | |
| | 0x5 | PIPExControl | | | Continuity[2:0] | | Toggle | | | TranGo |
| | 0x6 | PIPExFuncAddr | | | | | | | FuncAddr[2:0] | |
| | 0x7 | PIPExTotalSize_H | | | | TotalSize[23:16] | | | | |
| | 0x8 | PIPExTotalSize_M | | | | TotalSize[15:8] | | | | |
| | 0x9 | PIPExTotalSize_L | | | | TotalSize[7:0] | | | | |
| PC (EP) REGISTER | 0xA | EPxControl_0 | EnEndPoint | AutoForceNAK | EnShortPkt | AutoForceNAKShort | | | ForceNAK | ForceSTALL |
| | 0xB | EPxControl_1 | | | | | ToggleStat | | ToggleSet | ToggleClr |
| COMMON ACCESS CONTROL REGISTER | 0xC | xFIFOforCPU_H | | | | FIFOforCPU[15:8] | | | | |
| | 0xD | xFIFOforCPU_L | | | | FIFOforCPU[7:0] | | | | |
| | 0xE | xFIFOControl_0 | FIFOEmpty | FIFOFull | EnFIFOwr | EnFIFOrd | | | EnFIFOByteAccess | |
| | 0xF | xFIFOControl_1 | | | | FIFODataRemain[7:0] | | | | FIFODataRemain[10:8] |

FIG. 11

TRANSFER CONDITION (PIPE/EP) REGISTER FOR CONTROL TRANSFER

| | Addr. | Register Name | bit7 | bit6 | bit5 | bit4 | bit3 | bit2 | bit1 | bit0 |
|---|---|---|---|---|---|---|---|---|---|---|
| HC/PC (PIPE/EP) COMMON REGISTER | 0x0 | 0Config_0 | JoinDMA | FIFOClr | | AutoZeroLen | | | BufferPage[3:0] | |
| | 0x1 | 0Config_1 | DirPID[1:0] | | | | | EPNumber[3:0] | | |
| | 0x2 | (Reserved) | | | | | | | | |
| | 0x3 | 0MaxPktSize | | | | | MaxPktSize[6:0] | | | |
| HC (PIPE) REGISTER | 0x4 | PIPE0CTLAutoMode | | | | | | DataStageDir | NoDataStage | EnCTLAuto |
| | 0x5 | PIPE0Control | | | Continuity[2:0] | | Toggle | | | TranGo |
| | 0x6 | PIPE0FuncAddr | | | | | | | FuncAddr[2:0] | |
| | 0x7 | PIPE0TotalSize_H | | | | | TotalSize[23:16] | | | |
| | 0x8 | PIPE0TotalSize_M | | | | | TotalSize[15:8] | | | |
| | 0x9 | PIPE0TotalSize_L | | | | | TotalSize[7:0] | | | |
| PC (EP) REGISTER | 0xA | EP0Control_0 | | AutoForceNAK | InEnShortPkt | | InForceNAK | InForceSTALL | OutForceNAK | OutForceSTALL |
| | 0xB | EP0Control_1 | InToggleStat | | InToggleSet | InToggleClr | OutToggleStat | | OutToggleSet | OutToggleClr |
| COMMON ACCESS CONTROL REGISTER | 0xC | 0FIFOforCPU_H | | | | FIFOforCPU[15:8] | | | | |
| | 0xD | 0FIFOforCPU_L | | | | FIFOforCPU[7:0] | | | | |
| | 0xE | 0FIFOControl_0 | FIFOEmpty | FIFOFull | EnFIFOwr | EnFIFOrd | EnFIFOByteAccess | | FIFODataRemain[10:8] | |
| | 0xF | 0FIFOControl_1 | | | | FIFODataRemain[7:0] | | | | |

FIG. 12A

| REGISTER | BIT FIELD | DESCRIPTION |
|---|---|---|
| xConfig_0 | JoinDMA | CONNECTION OF DMA BUS |
| | FIFOClr | CLEARS BUFFER (PIPE/EP) REGION (RETURNS POINTER) |
| | ToggleMode | SETS TOGGLE SEQUENCE MODE DURING INTERRUPT TRANSFER |
| | AutoZeroLen | SETTING WHETHER OR NOT TO AUTOMATICALLY PROVIDE ZERO-LENGTH PACKET WHEN TRANSFER SPECIFIED BY TotalSize COMPLETES AT MAXIMUM PACKET SIZE |
| | BufferPage | PAGE NUMBER OF BUFFER (PIPE/EP) REGION |
| xConfgi_1 | DirPID | TRANSFER DIRECTION (TOKEN PID) |
| | TranType | TRANSFER (TRANSACTION) TYPE (ISOCHRONOUS, BULK, CONTROL, INTERRUPT) |
| | EPNumber | ENDPOINT NUMBER |
| xMaxPktSize_H | | MAXIMUM PACKET SIZE |
| xMaxPktSize_L | | |
| PIPExInterval | | TOKEN ISSUE INTERVAL FOR INTERRUPT TRANSFER |
| PIPExControl | Continuity | NUMBER OF CONTINUOUS EXECUTION TIMES OF TRANSACTIONS |
| | Toggle | SETS INITIAL VALUE OF TOGGLE BIT INDICATES TOGGLE VALUE DURING TRANSACTION |
| | TranGo | STARTS AUTOMATIC TRANSACTION |
| PIPExFuncAddr | | FUNCTION ADDRESS |
| PIPExTotalSize_H | | TOTAL SIZE OF TRANSFER DATA |
| PIPExTotalSize_M | | |
| PIPExTotalSize_L | | |
| xFIFOforCPU_H | | I/O PORT WHEN TRANSFERRING BETWEEN PACKET BUFFER (FIFO) AND SYSTEM MEMORY BY PIO TRANSFER |
| xFIFOforCPU_L | | |
| xFIFOControl_0 | FIFOEmpty | INDICATES Empty OF BUFFER (PIPE/EP) REGION |
| | FIFOFull | INDICATES Full OF BUFFER (PIPE/EP) REGION |
| | EnFIFOwr | WRITE ENABLE OF BUFFER (PIPE/EP) REGION |
| | EnFIFOrd | READ ENABLE OF THE ABOVE I/O |
| | EnFIFOByteAccess | ENABLES ACCESS OF FINAL ONE BYTE OF DATA WHEN ACCESSING ODD-NUMBERED BYTES OF DATA THROUGH THE ABOVE I/O |
| xFIFOControl_1 | FIFODataRemain | REMAINING AMOUNT OF DATA IN BUFFER (PIPE/EP) REGION |
| | FIFODataRemain | |

FIG. 12B

| REGISTER | BIT FIELD | DESCRIPTION |
|---|---|---|
| PIEP0CTLAutoMode | DataStageDir | SPECIFIES TRANSFER DIRECTION OF DATA STAGE WHEN THE DATA STAGE EXISTS |
| | NoDataStage | SPECIFIES PRESENCE OR ABSENCE OF DATA STAGE |
| | EnCTLAuto | ON/OFF OF CONTROL TRANSFER AUTO MODE |

FIG. 13

| | | |
|---|---|---|
| EPxControl_0 | EnEndPoint | ENDPOINT ENABLE/DISABLE |
| | AutoForceNAK | AUTOMATICALLY SETS ForceNAK BIT OF THE SELF-ENDPOINT WHEN TRANSACTION IS COMPLETED NORMALLY |
| | EnShortPkt | SHORT PACKET TRANSFER BIT |
| | AutoForceNAKShort | AUTOMATICALLY SETS ForceNAK BIT OF THE SELF-ENDPOINT WHEN TRANSACTION IS COMPLETED NORMALLY IN THE CASE WHERE RECEIVED DATA IS SHORT PACKET |
| | ForceNAK | UNCONDITIONAL NAK REPLY |
| | ForceSTALL | UNCONDITIONAL STALL REPLY |
| EPxControl_1 | ToggleStat | INDICATES TOGGLE BIT STATE |
| | ToggleSet | TOGGLE INITIAL VALUE 1 |
| | ToggleClr | TOGGLE INITIAL VALUE 0 |
| EP0Control_0 | AutoForceNAK | AUTOMATICALLY SETS InForceNAK BIT OR OutForceNAK BIT WHEN TRANSACTION IS COMPLETED NORMALLY |
| | InEnShortPkt | SHORT PACKET TRANSFER BIT |
| | InForceNAK | UNCONDITIONAL NAK REPLY TO IN TRANSACTION |
| | InForceSTALL | UNCONDITIONAL STALL REPLY TO IN TRANSACTION |
| | OutForceNAK | UNCONDITIONAL NAK REPLY TO OUT TRANSACTION |
| | OutForceSTALL | UNCONDITIONAL STALL REPLY TO OUT TRANSACTION |
| EP0Control_1 | InToggleStat | INDICATES TOGGLE BIT STATE OF IN TRANSACTION |
| | InToggleSet | IN TRANSACTION TOGGLE INITIAL VALUE 1 |
| | InToggleClr | IN TRANSACTION TOGGLE INITIAL VALUE 0 |
| | OutToggleStat | INDICATES TOGGLE BIT STATE OF OUT TRANSACTION |
| | OutToggleSet | OUT TRANSACTION TOGGLE INITIAL VALUE 1 |
| | OutToggleClr | OUT TRANSACTION TOGGLE INITIAL VALUE 0 |

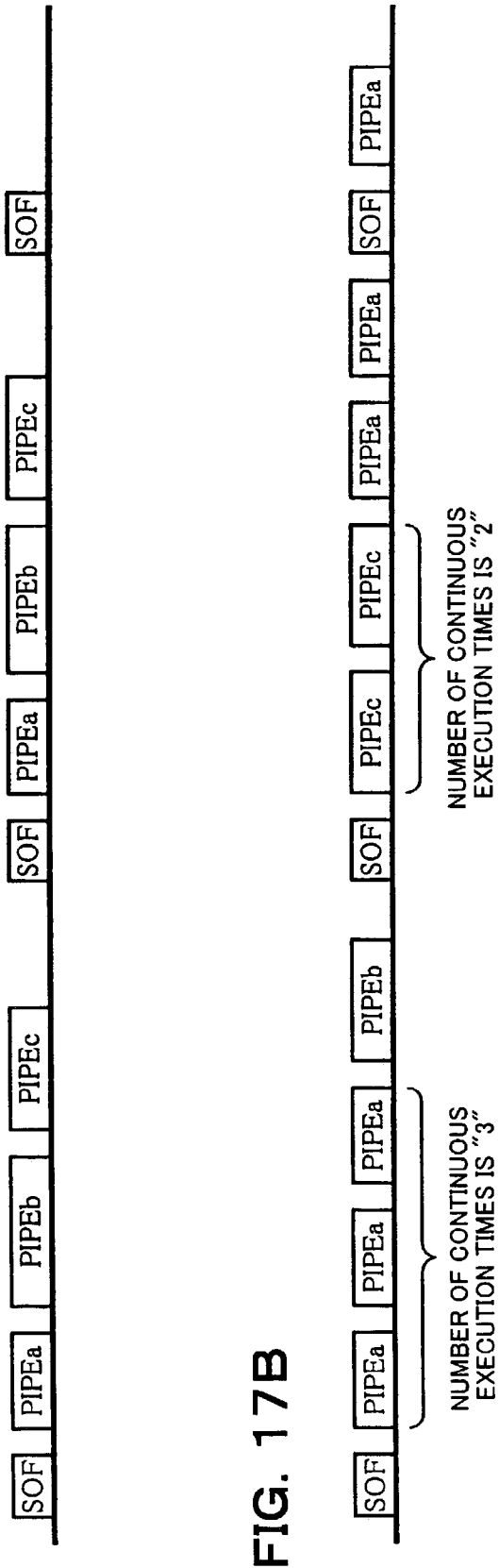

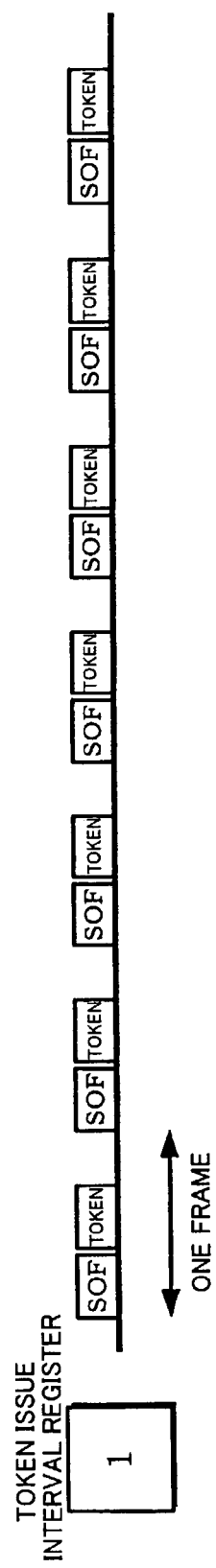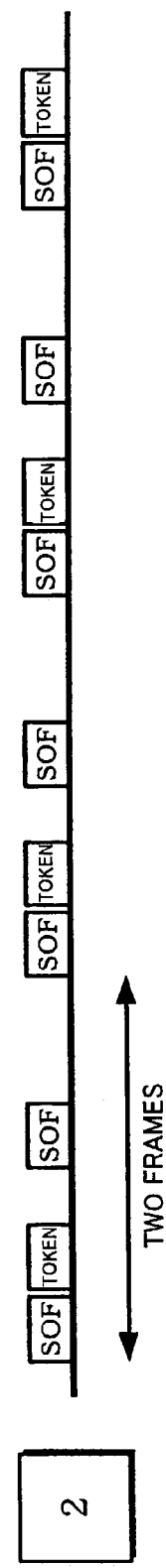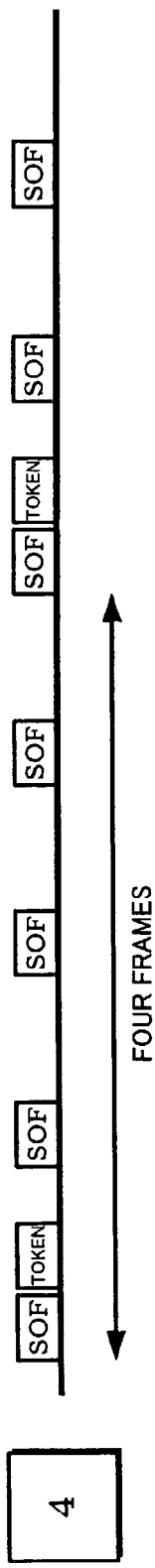

TRANSMISSION (DMA OR CPU → PACKET BUFFER → USB)

|    | WHEN DMA TRANSFER IS USED | WHEN CPU TRANSFER IS USED |
|----|---------------------------|---------------------------|
| WP | DMA                       | CPU                       |
| RP | USB                       | USB                       |

RECEPTION (USB → PACKET BUFFER → DMA OR CPU)

|    | WHEN DMA TRANSFER IS USED | WHEN CPU TRANSFER IS USED |
|----|---------------------------|---------------------------|
| WP | USB                       | USB                       |
| RP | DMA                       | CPU                       |

US 7,028,109 B2

DATA TRANSFER CONTROL DEVICE INCLUDING BUFFER CONTROLLER WITH PLURALITY OF PIPE REGIONS ALLOCATED TO PLURALITY OF ENDPOINTS

Japanese Patent Application No. 2002-118206 filed on Apr. 19, 2002, is hereby incorporated by reference in its entirety.

BACKGROUND OF THE INVENTION

The present invention relates to a data transfer control device, electronic equipment, and a data transfer control method.

The market for Universal Serial Bus (USB) 2.0 which supports the High Speed (HS) mode has grown steadily. An interface standard called USB On-The-Go (OTG) has been standardized by the USB Implementers Forum (USB-IF). The OTG standard (OTG 1.0) which is an extension of USB 2.0 has the potential for creating new added value for the USB interface, and development of applications making use of its characteristics has been anticipated.

According to OTG, peripherals (peripheral devices) which have been connected with a host (personal computer or the like) through the USB can be allowed to have a function of a host. This enables peripherals to be connected through the USB and data to be transferred therebetween. For example, if a digital camera is directly connected with a printer, an image from the digital camera can be printed by the printer. If a digital camera or a digital video camera is connected with a storage device, data in the digital camera or digital video camera can be stored in the storage device.

However, a low performance CPU (processing unit) is generally incorporated in the peripheral which is allowed to perform the host function by OTG. Therefore, if the processing load of the CPU (firmware) included in the peripheral is increased or processing is complicated by the addition of the host function, another processing may be hindered or the design period of the equipment may be increased.

BRIEF SUMMARY OF THE INVENTION

One aspect of the present invention relates to a data transfer control device for data transfer through a bus, comprising:

a buffer controller which controls access to a packet buffer including a plurality of pipe regions, each of the pipe regions being allocated corresponding to each of a plurality of endpoints and data transferred to and from each of the endpoints being stored in each of the pipe regions;

a register section including a plurality of transfer condition registers, transfer condition information on data transfer between each of the pipe regions and each of the endpoints being set in the transfer condition registers, and a transfer controller which automatically generates a transaction for each of the endpoints based on the transfer condition information set in the transfer condition registers and automatically transfers data between each of the pipe regions and corresponding each of the endpoints.

BRIEF DESCRIPTION OF THE SEVERAL VIEWS OF THE DRAWING

FIGS. 2A and 2B describe SRP and HNP procedures;
FIGS. 3A and 3B describe list structure type descriptors of OHCI and the like;
FIGS. 6A and 6B describe pipe regions and endpoint regions;
FIG. 9 describes a register section;
FIG. 10 shows a detailed example of a register map of general-purpose transfer condition registers;
FIG. 11 shows a detailed example of a register map of transfer condition registers for control transfer;
FIGS. 12A and 12B show a summary of transfer condition information set in each bit field of the transfer condition registers;
FIG. 13 shows a summary of the transfer condition information set in each bit field of the transfer condition registers;
FIGS. 17A and 17B describe a technique of setting the number of continuous execution times of transactions.
FIGS. 18A, 18B, and 18C describe a technique of setting a token issue interval for interrupt transfer.

DETAILED DESCRIPTION OF THE EMBODIMENT

Figure 1A:
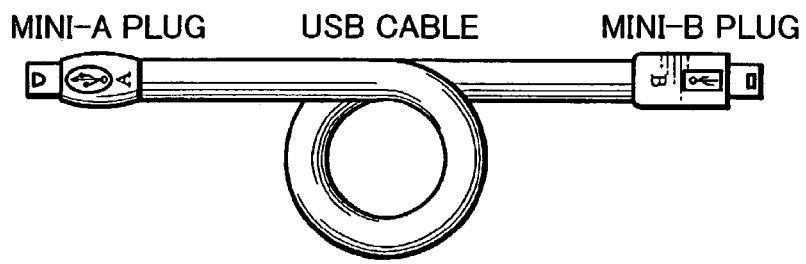
FIGS. 1A, 1B, and 1C describe the USB OTG standard.

Embodiments of the present invention are described below.

Note that the embodiments described hereunder do not in any way limit the scope of the invention defined by the claims laid out herein. Note also that all of the elements of these embodiments should not be taken as essential requirements to the means of the present invention.

One embodiment of the present invention relates to data transfer control device for data transfer through a bus, comprising:

a buffer controller which controls access to a packet buffer including a plurality of pipe regions, each of the pipe regions being allocated corresponding to each of a plurality of endpoints and data transferred to and from each of the endpoints being stored in each of the pipe regions;

a register section including a plurality of transfer condition registers, transfer condition information on data transfer between each of the pipe regions and each of the endpoints being set in the transfer condition registers, and a transfer controller which automatically generates a transaction for each of the endpoints based on the transfer condition information set in the transfer condition registers and automatically transfers data between each of the pipe regions and corresponding each of the endpoints.

In this data transfer control device, a plurality of pipe regions (buffer regions) are allocated in the packet buffer. In this case, each of the pipe regions is allocated corresponding to each of the endpoints of the bus. Data transferred (transmitted or received) between each of the pipe regions and each of the endpoints corresponding thereto is stored (buffered) in each of the pipe regions. The buffer controller performs access control (area management) of the packet buffer (buffer) in which the pipe regions are allocated.

In this data transfer control device, the transfer condition information (endpoint information, pipe information) on data transferred between each of the pipe regions and each of the endpoints is set in each of the transfer condition registers (pipe registers). The transfer controller automatically generates a transaction for each of the endpoints based on the transfer condition information set in each of the transfer condition registers, and automatically transfers data between each of the pipe regions and each of the end points. This enables the processing load of a processing unit which controls the data transfer control device to be reduced, for example.

In this data transfer control device, the transfer condition information set in the transfer condition registers may include a total size of data transferred to and from each of the endpoints, a maximum packet size, and a data transfer direction, and the transfer controller may automatically transfer data of the total size between each of the pipe regions and corresponding each of the endpoints by using a packet with a payload of the maximum packet size in a direction specified by the transfer direction.

This enables data to be automatically transferred by merely setting the transfer condition information such as the total size, the maximum packet size, and the transfer direction in the transfer condition registers, whereby the processing load of a processing unit can be reduced, for example.

In this data transfer control device, the transfer condition information set in the transfer condition registers may include a transfer type of data transfer, and the transfer controller may automatically transfer data in each of the pipe regions by means of data transfer of the transfer type set in the transfer condition registers.

This enables data in each of the pipe regions to be transferred by means of data transfer of an arbitrary transfer type (periodic transfer such as isochronous or interrupt or nonperiodic transfer such as bulk or control, for example).

In this data transfer control device, the transfer condition information set in the transfer condition registers may include transfer ratio information between the pipe regions, and the transfer controller may automatically transfer data in each of the pipe regions at a transfer ratio set by the transfer ratio information.

This enables data in the plurality of pipe regions to be transferred at an arbitrary transfer ratio, whereby data transfer can be efficiently scheduled.

In this data transfer control device, the transfer ratio information may be the number of continuous execution times of transactions relating to each of the pipe regions.

This enables a data transfer transaction in the (K+1)th pipe region to be executed (generated) after several times of data transfer transactions in the K-th pipe region are continuously executed, for example.

In this data transfer control device, the transfer condition information set in the transfer condition registers may include a token issue interval for interrupt transfer, and the transfer controller may automatically transfer a token packet for interrupt transfer at the token issue interval set in the transfer condition registers.

This enables token packets for interrupt transfer to be issued without using descriptors having a binary tree structure and the like.

In this data transfer control device, the pipe regions may include a pipe region dedicated to an endpoint for control transfer among the endpoints and a general-purpose pipe region capable of being assigned to arbitrary one of the endpoints.

This enables correspondence between the pipe regions and the endpoints to be dynamically changed, whereby data transfer can be efficiently scheduled.

This data transfer control device may include an interface circuit which transfers data between another bus, which is different from the bus, and the packet buffer, and the interface circuit may transfer data through the other bus and the transfer controller may transfer data through the bus when a processing unit instructs the interface circuit and the transfer controller to start data transfer, and the transfer controller may generate an interrupt for the processing unit when the data transfer is completed.

Therefore, it suffices that the processing unit does not control the data transfer control device until the interrupt occurs after setting the transfer conditions and instructing the interface circuit and the transfer controller to start data transfer through the bus and another bus (bus of processing unit, bus of system memory, or the like). This enables the processing load of the processing unit to be reduced and the like.

This data transfer control device may include a state controller which controls a plurality of states including a state of a host operation, in which the data transfer control device operates as a role of a host, and a state of a peripheral operation, in which the data transfer control device operates as a role of a peripheral, the transfer controller may include a host controller which transfers data as the host during the host operation and a peripheral controller which transfers data as the peripheral during the peripheral operation, and the plurality of pipe regions may be allocated in the packet buffer during the host operation, and the host controller may automatically transfer data between each of the allocated pipe regions and corresponding each of the endpoints.

According to this data transfer control device, when the state controlled by the state controller becomes the state of the host operation, the host controller transfers data in the role of the host. When the state controlled by the state controller becomes the state of the peripheral operation, the peripheral controller transfers data in the role of the peripheral. This enables a so-called dual-role device function to be realized.

In this data transfer control device, the plurality of pipe regions are allocated in the packet buffer during the host operation, and data is automatically transferred between the allocated pipe regions and the endpoints. This enables the dual-role device function to be realized and the processing load of the processing unit during the host operation to be reduced.

In this data transfer control device, data may be transferred according to a Universal Serial Bus (USB) On-The-Go (OTG) standard.

Another embodiment of the present invention relates to electronic equipment including: the above data transfer control device; a device which performs output processing, fetch processing, or storage processing of data transferred through the data transfer control device and the bus; and a processing unit which controls data transfer of the data transfer control device.

A further embodiment of the present invention relates to a data transfer control method for data transfer through a bus, the method including:

allocating a plurality of pipe regions in a packet buffer, data transferred to and from each of a plurality of endpoints being stored in each of the pipe regions;

setting transfer condition information on data transfer between each of the pipe regions and each of the endpoints in a plurality of transfer condition registers; and automatically generating a transaction for each of the endpoints based on the transfer condition information set in the transfer condition registers and automatically transferring data between each of the pipe regions and corresponding each of the endpoints.

The embodiments of the present invention are described below in more detail with reference to the drawings.

1. OTG

USB On-The-Go (OTG) is briefly described below.

1.1 A-Device and B-Device

OTG defines a Mini-A plug and a Mini-B plug shown in FIG. 1A as the connector standard. OTG also defines a Mini-AB receptacle as a connector which can be connected with both the Mini-A plug and the Mini-B plug (first and second plugs of a cable in a broad sense).

Figure 1B:
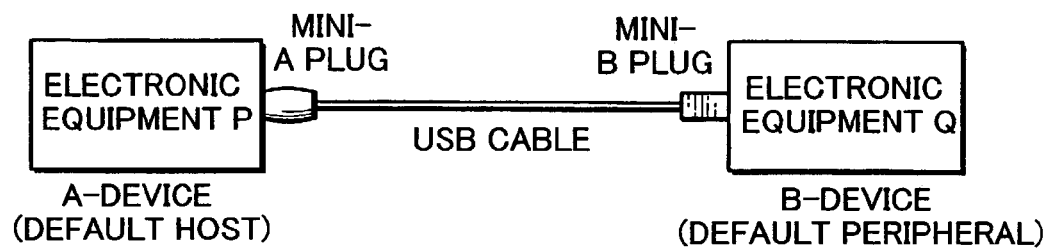
Figure 1C:
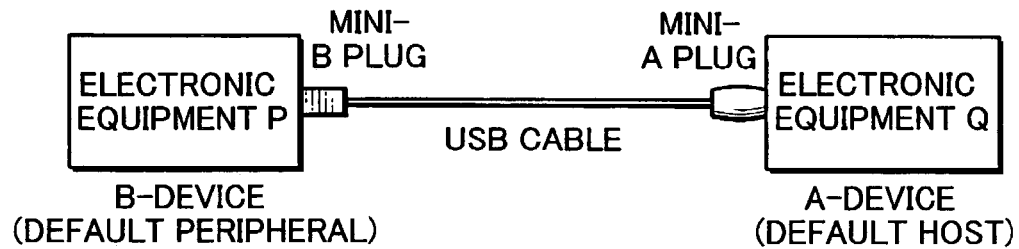

As shown in FIG. 1B, when electronic equipment P is connected with the Mini-A plug of the USB cable and electronic equipment Q is connected with the Mini-B plug, the electronic equipment P is set as the A-device and the electronic equipment Q is set as the B-device. When the Mini-B plug and the Mini-A plug are respectively connected with the electronic equipment P and the electronic equipment Q as shown in FIG. 1C, the electronic equipment P and the electronic equipment Q are respectively set as the B-device and the A-device.

An ID pin is connected with GND in the Mini-A plug and an ID pin is in a floating state in the Mini-B plug. The electronic equipment judges whether the Mini-A plug or the Mini-B plug is connected therewith by detecting the voltage level of the ID pin using a built-in pull-up resistor circuit.

In OTG, the A-device (master) provides a power supply (VBUS) (supplier) and the B-device (slave) receives the power supply (receiver) The default state of the A-device is a host and the default state of the B-device is a peripheral (peripheral device).

1.2 Dual-role Device

OTG defines a dual-role device which is capable of having the role of the host (simple host) and the role of the peripheral.

The dual-role device becomes either the host or the peripheral. If a device connected with the dual-role device is the host or the peripheral in the conventional USB standard, the role of the dual-role device is determined uniquely. In other words, if a device connected with the dual-role device is the host, the dual-role device becomes the peripheral. If a device connected with the dual-role device is the peripheral, the dual-role device becomes the host.

If a device connected with the dual-role device is also a dual-role device, the dual-role devices can exchange the role of the host and the role of the peripheral.

1.3 SRP and HNP

The dual-role device has functions of Session Request Protocol (SRP) and Host Negotiation Protocol (HNP) shown in FIGS. 2A and 2B.

SRP is a protocol for the B-device to request the A-device to supply the power supply VBUS.

In OTG, the A-device can suspend the power supply VBUS when the bus is not used. This prevents occurrence of unnecessary power consumption in the case where the A-device is a small piece of portable equipment, for example. If the B-device needs the power supply VBUS after the A-device suspends the power supply VBUS, the B-device requests the A-device to provide the power supply VBUS by using SRP.

FIG. 2A shows a flowsheet of SRP. As shown in FIG. 2A, the B-device requests the A-device to provide the power supply VBUS by data line pulsing and VBUS pulsing. The B-device starts a peripheral operation and the A-device starts a host operation after the A-device starts to provide the power supply VBUS.

As described with reference to FIGS. 1A to 1C, in the case where the dual-role devices are connected, the A-device connected with the Mini-A plug is the default host and the B-device connected with the Mini-B plug is the default peripheral. In OTG, the host and peripheral roles can be exchanged without plugging or unplugging. HNP is a protocol for exchanging the host and peripheral roles.

FIG. 2B is a flowsheet for the HNP. When the A-device which functions as the default host terminates using the bus, the bus is in an idle state. The B-device then disables the pull-up resistor of a data signal line DP (D+), and the A-device enables the pull-up resistor of the data signal line DP. Therefore, the role of the A-device is changed to the peripheral from the host, whereby the A-device starts the operation as the peripheral. The role of the B-device is changed to the host from the peripheral, whereby the B-device starts the operation as the host.

When the B-device terminates using the bus and the A-device disables the pull-up resistor of DP, the B-device enables the pull-up resistor of the data signal line DP. Therefore, the role of the B-device is returned to the peripheral from the host, whereby the B-device starts the operation as the peripheral. The role of the A-device is returned to the host from the peripheral, whereby the A-device starts the operation as the host.

According to the above-described OTG, portable equipment such as a portable telephone and a digital camera can be allowed to operate as the USB host, whereby data can be transferred between two pieces of portable equipment through peer-to-peer connection. This enables new added value to be produced for the USB interface, whereby new types of applications can be created.

2. OHCI

In the conventional USB standard, a data transfer control device (host controller) included in a personal computer as the host conforms to a standard such as OHCI (Open Host Controller Interface) proposed by Microsoft or UHCI (Universal Host Controller Interface). An OS (Operating System) to be used is limited to Microsoft Windows or Apple Macintosh OS.

However, the architecture of the CPU to be incorporated or the OS to be used in a small piece of portable equipment, which is the target application of OTG, are multifarious. Moreover, since the OHCI and UHCI are standardized for a host controller of a personal computer, these standards are developed on the assumption that the functions as the USB host are entirely provided. Therefore, the OHCI and UHCI are not suitable for functions provided to a small piece of portable equipment.

Figure 3A:
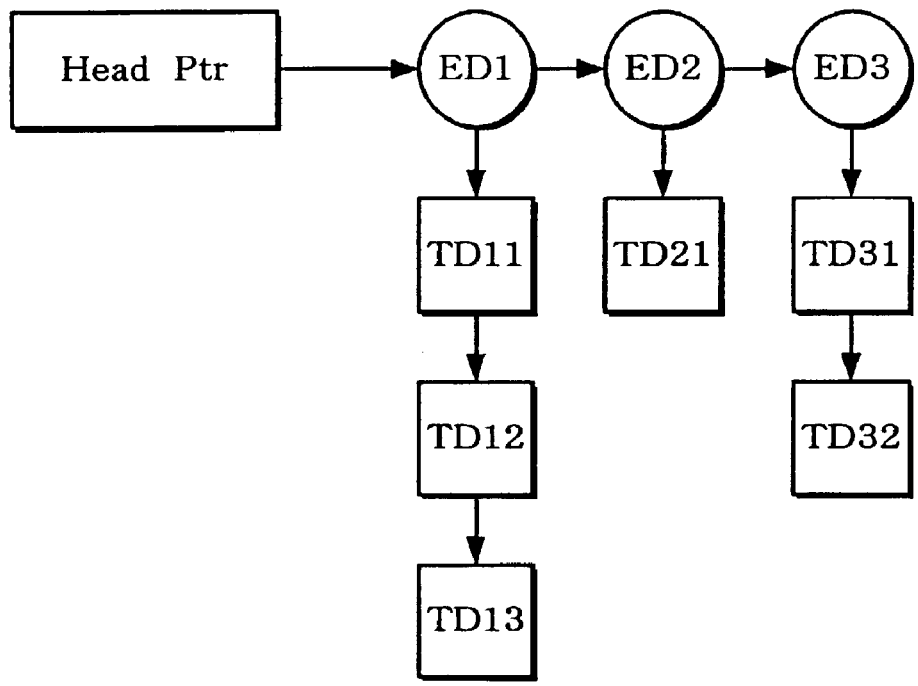

FIG. 3A shows an example of list structure type descriptors used in the OHCI.

In FIG. 3A, endpoint descriptors ED1, ED2, and ED3 are linked by link pointers and contain information necessary for communicating with endpoints 1, 2, and 3. Transfer descriptors TD11 to TD13, TD21, and TD31 to TD32 are linked to the endpoint descriptors ED1, ED2, and ED3 by link pointers. The transfer descriptors contain information necessary for packet data to be transferred to and from the endpoints 1, 2, and 3.

Figure 3B:
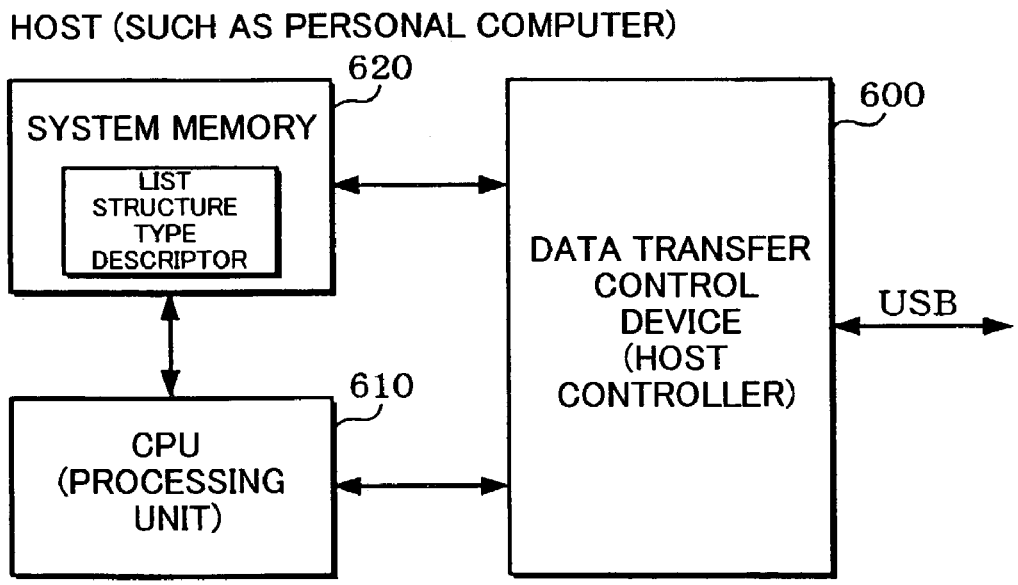

Firmware (host controller driver) which operates on a CPU 610 (processing unit in a broad sense) shown in FIG. 3B creates the list structure type descriptors shown in FIG. 3A and writes the descriptors in a system memory 620. Specifically, the firmware assigns the endpoint descriptors to the endpoints in the system and creates the endpoint descriptors and the transfer descriptors based on endpoint information and the like. The firmware links the descriptors together by the link pointers and writes the descriptors in the system memory 620.

A data transfer control device (host controller) 600 reads the list structure type descriptors written in the system memory 620 and transfers data based on information described in the endpoint descriptors and the transfer descriptors.

In more detail, the data transfer control device (host controller) 600 sets information on the endpoint 1 based on the ED1 and transfers data to and from the endpoint 1 based on the transfer descriptor TD11 linked to the endpoint descriptor ED1. The data transfer control device 600 sets information on the endpoint 2 based on the endpoint descriptor ED2 and transfers data to and from the endpoint 2 based on the transfer descriptor TD21 linked to the endpoint descriptor ED2. Similarly, the data transfer control device 600 transfers data based on the transfer descriptors TD31, TD12, TD32, and TD13.

Figure 4:
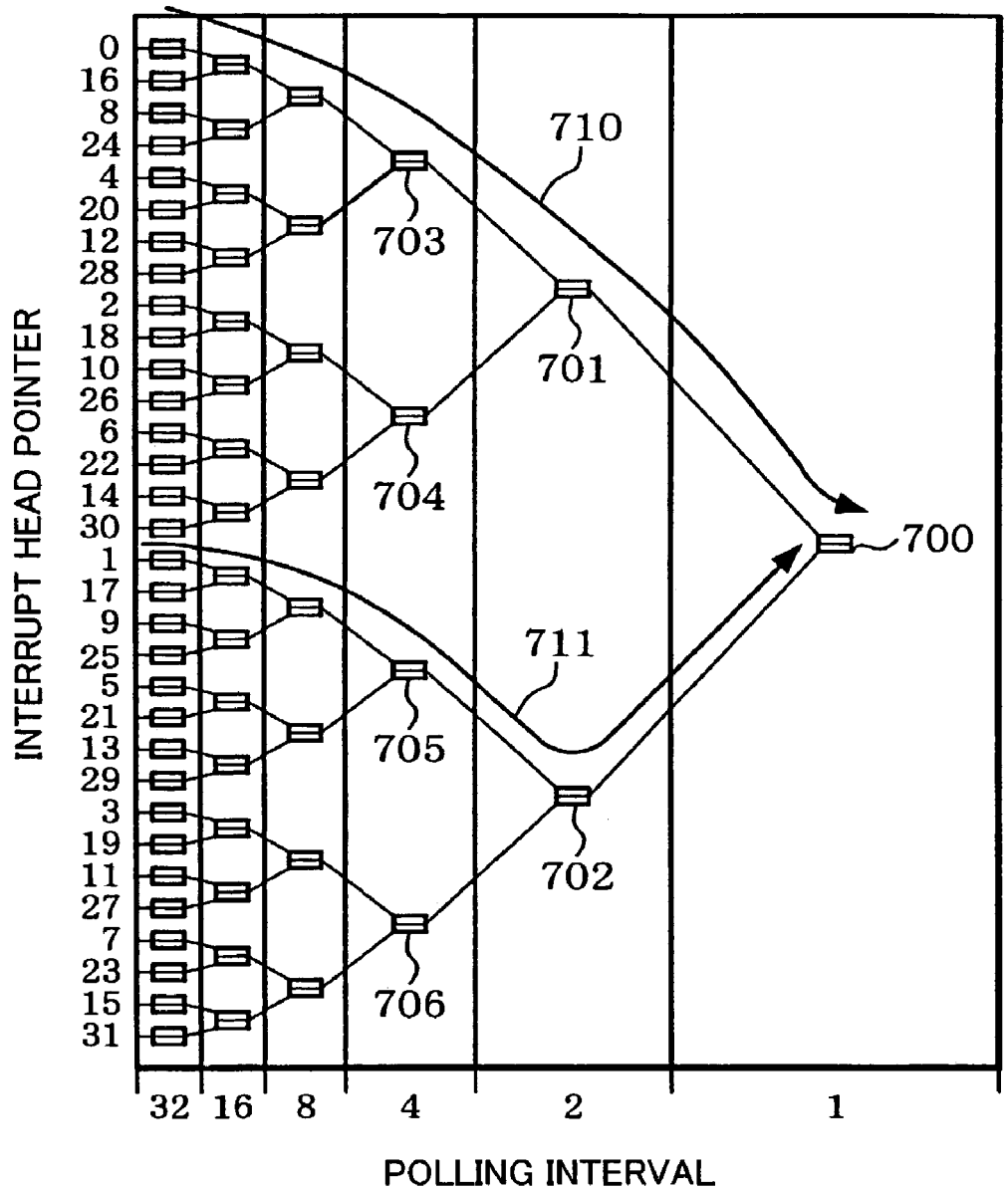
FIG. 4 describes the descriptor of OHCI having a binary tree structure.

In the case of performing interrupt transfer, the firmware (host controller driver) which operates on the CPU 610 creates descriptors having a binary tree structure shown in FIG. 4. For example, descriptors of an endpoint which performs polling for interrupt transfer at an interval of 1 ms are set in a placeholder 700 shown in FIG. 4. Descriptors of an endpoint which performs polling at an interval of 2 ms are set in placeholders 701 and 702. Descriptors of an endpoint which performs polling at an interval of 4 ms are set in placeholders 703, 704, 705, and 706.

When polling, a binary tree search is performed from the placeholder in the lowermost layer according to indices of interrupt head pointers. Specifically, a binary tree search is performed for an index 0 from the lowermost layer as indicated by a path 710 shown in FIG. 4. A binary tree search is then performed for an index 1 as indicated by a path 711. Similarly, a binary tree search is performed for indices 2 to 31. This allows interrupt transfer to be performed at an interval of 1 ms (1 frame) for an endpoint corresponding to the placeholder 700, at an interval of 2 ms for an endpoint corresponding to the placeholders 701 and 702, and at an interval of 4 ms for an endpoint corresponding to the placeholders 703 to 706.

In the data transfer control device (host controller) conforming to the OHCI, the firmware (host controller driver) which operates on the CPU must create descriptors having a complicated structure shown in FIGS. 3A and 4. Therefore, the processing load of the CPU is significantly heavy.

In the conventional USB standard, the role of the host is assigned to only a personal computer having a high performance CPU. Therefore, the personal computer can afford to create descriptors having a complicated structure shown in FIGS. 3A and 4.

However, performance of an embedded CPU incorporated in a small piece of portable equipment (digital camera, portable telephone, and the like), which is the target application of OTG, is generally significantly lower than the performance of the CPU of the personal computers. Therefore, if the portable equipment is allowed to perform the host operation of OTG, an excessive load is applied to the CPU incorporated in the portable equipment, whereby another processing may be hindered or the performance of data transfer may be decreased.

3. Configuration Example

Figure 5:
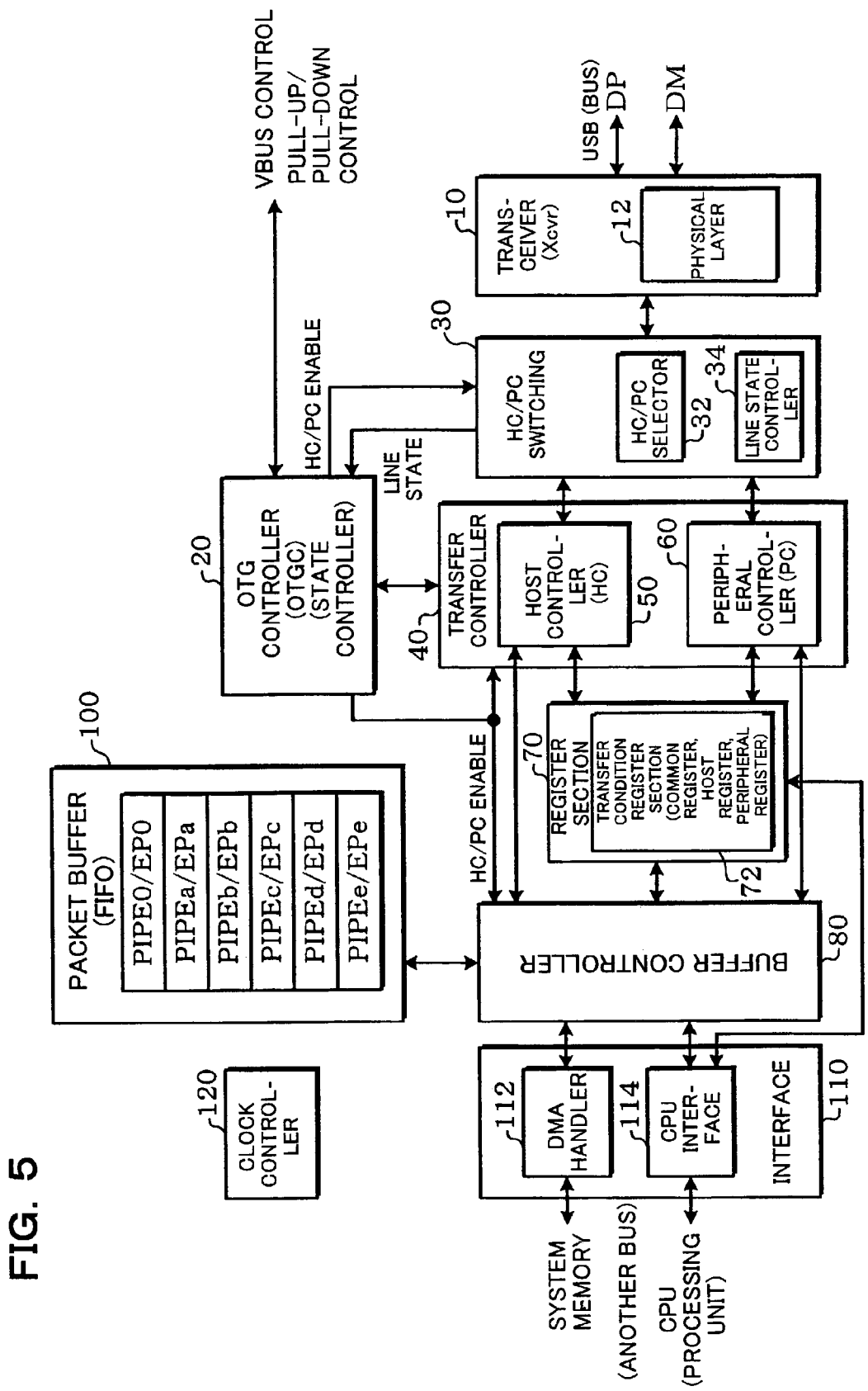
FIG. 5 shows a configuration example of a data transfer control device in an embodiment of the present invention.

FIG. 5 shows a configuration example of a data transfer control device in the present embodiment which is capable of solving the above problems. The data transfer control device in the present embodiment does not necessary include all the circuit blocks shown in FIG. 1, and some of these circuit blocks may be omitted.

A transceiver 10 (hereinafter may be called "Xcvr") is a circuit which transmits and receives data through the USB (bus in a broad sense) by using differential data signals DP and DM and includes a USB physical layer (PHY) circuit 12. In more detail, the transceiver 10 generates line states (J, K, SE0, and the like) of the data signals DP and DM and performs serial/parallel conversion, parallel/serial conversion, bit stuffing, bit unstuffing, NRZI decoding, NRZI encoding, and the like. The transceiver 10 may be provided outside the data transfer control device.

An OTG controller 20 (state controller in a broad sense, hereinafter may be called "OTGC") performs various types of processing for realizing the SRP function and the HNP function (see FIGS. 2A and 2B) of OTG. Specifically, the OTG controller 20 controls a plurality of states including a state of the host operation in which the data transfer control device operates as a role of the host, a state of a peripheral operation in which the data transfer control device operates as a role of the peripheral, and the like.

In more detail, the OTG standard defines state transitions of the dual-role device when operating as the A-device (see FIGS. 1B and 1C) and as the B-device. The OTG controller 20 includes a state machine for realizing the state transitions. The OTG controller 20 includes a circuit which detects (monitors) a USB data line state, a VBUS level, and an ID pin state. The state machine included in the OTG controller 20 changes the state (such as a host, peripheral, suspend, and idle) based on the detected information. The state transitions may be realized by a hardware circuit or allowing the firmware to set state commands in registers. When the state transition occurs, the OTG controller 20 controls the power supply VBUS or connection/disconnection of a pull-up resistor/pull-down resistor of the data signal lines DP and DM based on the state after transition. The OTG controller 20 controls enabling/disabling of a host controller 50 (hereinafter may be called "HC") and a peripheral controller 60 (hereinafter may be called "PC").

An HC/PC switching circuit (HC/PC common circuit) 30 switches connection between the transceiver 10 and the host controller 50 or the peripheral controllers 60. The HC/PC switching circuit 30 instructs the transceiver 10 to generate the line state of USB data (DP, DM). The switching of connection is realized by an HC/PC selector 32. The instruction for line state generation is realized by a line state controller 34.

When the OTG controller 20 activates an HC enable signal during the host operation (in the host state), the HC/PC switching circuit 30 (HC/PC selector 32) connects the transceiver 10 with the host controller 50. When the OTG controller 20 activates a PC enable signal during the peripheral operation (in the peripheral state), the HC/PC switching circuit 30 connects the transceiver 10 with the peripheral controller 60. This enables the host controller 50 and the peripheral controller 60 to be operated exclusively.

A transfer controller 40 is a circuit which controls data transfer through the USB (bus in a broad sense) and includes the host controller (HC) 50 and the peripheral controller (PC) 60.

The host controller 50 is a circuit which controls data transfer in the role of the host during the host operation (when the HC enable signal from the OTG controller 20 is active).

Specifically, the host controller 50 is connected with the transceiver 10 by the HC/PC switching circuit 30 during the host operation. The host controller 50 automatically generates transactions to the endpoints based on transfer condition information set in a transfer condition register section 72 in a register section 70. The host controller 50 automatically transfers data (packet) (data transfer by a hardware circuit in which a processing unit does not take part) between pipe regions (PIPE0 to PIPEe, hereinafter may be called "PIPE") allocated in a packet buffer 100 and the endpoints corresponding to the pipe regions.

In more detail, the host controller 50 intervenes in a plurality of pipe transfers and performs time management of frames, transfer scheduling, resend management, and the like. The host controller 50 manages transfer condition information (operation information) of pipe transfer through the register section 70. The host controller 50 also manages transactions, assembles/disassembles the packet, and instructs generation of a suspend/resume/reset state.

The peripheral controller 60 is a circuit which controls data transfer in the role of the peripheral during the peripheral operation (when the PC enable signal from the OTG controller 20 is active).

Specifically, the peripheral controller 60 is connected with the transceiver 10 by the HC/PC switching circuit 30 during the peripheral operation. The peripheral controller 60 transfers data between endpoint regions (EP0 to EPe, hereinafter may be called "EP") allocated in the packet buffer 100 and the host based on the transfer condition information set in the transfer condition register section 72 in the register section 70.

In more detail, the peripheral controller 60 manages transfer condition information (operation information) of endpoint transfer through the register section 70. The peripheral controller 60 manages transactions, assembles/disassembles the packet, and instructs generation of a remote wakeup signal.

The endpoints are points (portions) of the peripheral (device) to which unique addresses can be assigned. Data transfer between the host and the peripheral (device) is always performed through the endpoints. A transaction is made up of a token packet, an optional data packet, and an optional handshake packet.

The register section 70 includes various types of registers for performing data transfer (pipe transfer and endpoint transfer) control, buffer access control, buffer management, interrupt control, block control, DMA control, and the like. The registers included in the register section 70 may be realized by a memory such as a RAM, D flip-flops, and the like. The registers in the register section 70 may not be collected together and may be dispersed in each block (HC, PC, OTGC, Xcvr, and the like).

The register section 70 includes the transfer condition register section 72. The transfer condition register section 72 includes registers for storing transfer condition information (transfer control information) on data transfer between the pipe regions (PIPE0 to PIPEe) allocated in the packet buffer 100 during the host operation and the endpoints. Each of the transfer condition registers is provided corresponding to each pipe region in the packet buffer 100.

The endpoint regions (EP0 to EPe) are allocated in the packet buffer 100 during the peripheral operation. Data is transferred between the data transfer control device and the host based on the transfer condition information set in the transfer condition register section 72.

A buffer controller (FIFO manager) 80 controls access (read/write) to the packet buffer 100 and performs area management. In more detail, the buffer controller 80 generates and manages the access address to the packet buffer 100 by the CPU (processing unit in a broad sense), DMA (Direct Memory Access), and USB. The buffer controller 80 intervenes in accesses to the packet buffer 100 by the CPU, DMA, and USB.

For example, the buffer controller 80 sets (establishes) a data transfer path between an interface circuit 110 (CPU or DMA) and the packet buffer 100 and a data transfer path between the packet buffer 100 and the host controller 50 (USB) during the host operation.

The buffer controller 80 sets a data transfer path between the interface circuit (CPU or DMA) 110 and the packet buffer 100 and a data transfer path between the packet buffer 100 and the peripheral controller (USB) 60 during the peripheral operation.

The packet buffer 100 (FIFO, packet memory, or buffer) temporarily stores (buffers) data transferred through the USB (transmission or reception data). The packet buffer 100 may be formed by a RAM (Random Access Memory), for example. The packet buffer 100 may be provided outside the data transfer control device (may be an external memory).

The packet buffer 100 is used as a pipe transfer First-In First-Out (FIFO) during the host operation. Specifically, the pipe regions PIPE0 to PIPEe (buffer regions in a broad sense) are allocated in the packet buffer 100 corresponding to each endpoint of the USB (bus). Data (transmission or reception data) transferred between the pipe regions PIPE0 to PIPEe and the corresponding endpoints is stored in each of the pipe regions PIPE0 to PIPEe.

The packet buffer 100 is used as an endpoint transfer FIFO during the peripheral operation. Specifically, the endpoint regions EP0 to EPe (buffer regions in a broad sense) are allocated in the packet buffer 100 during the peripheral operation. Data (transmission or reception data) transferred between the endpoint regions EP0 to EPe and the host is stored in each of the endpoint regions EP0 to EPe.

The buffer regions (regions which are set as the pipe regions during the host operation and as the endpoint regions during the peripheral operation) allocated in the packet buffer 100 are set to be storage regions in which information input first is output first (FIFO regions).

The pipe region PIPE0 is a pipe region dedicated to the endpoint 0 for control transfer. The pipe regions PIPEa to PIPEe are general-purpose pipe regions which can be assigned to arbitrary endpoints.

In the USB standard, the endpoint 0 is set as an endpoint dedicated to control transfer. Therefore, confusion by the user can be avoided by setting the pipe region PIPE0 as the pipe region dedicated to control transfer as in the present embodiment. Moreover, the pipe regions corresponding to the endpoints can be dynamically changed by setting the pipe regions PIPEa to PIPEe as pipe regions which can be assigned to arbitrary endpoints. This increases the degree of freedom relating to pipe transfer scheduling, whereby efficiency of data transfer can be increased.

In the present embodiment, a region size RSize of the buffer region (pipe region or endpoint region) is set by a maximum packet size MaxPktSize (page size in a broad sense) and a page number BufferPage (RSize=MaxPktSize× BufferPage). This enables the size and the number of layers (page number) of the buffer region to be arbitrarily set, whereby resources of the packet buffer 100 can be efficiently utilized.

The interface circuit 110 is a circuit for performing data transfer between the DMA (system memory) bus or the CPU bus (another bus) differing from the USB and the packet buffer 100. The interface circuit 110 includes a DMA handler circuit 112 for performing DMA transfer between the packet buffer 100 and the external system memory. The interface circuit 110 also includes a CPU interface circuit 114 for performing PIO (Parallel I/O) transfer between the packet buffer 100 and the external CPU. The CPU (processing unit) may be included in the data transfer control device.

A clock controller 120 generates various types of clocks used in the data transfer control device based on a built-in PLL or an external clock.

4. Pipe Region

In the present embodiment, the pipe regions PIPE0 to PIPEe are allocated in the packet buffer 100 during the host operation, as shown in FIG. 6A. Data is transferred between each of the pipe regions PIPE0 to PIPEe and each endpoint of the peripheral.

The meaning of the "pipe" of the pipe region in the present embodiment differs to some extent from the "pipe" defined in the USB (a logical abstraction or a logical path representing the association between an endpoint on a device and software on the host).

As shown in FIG. 6A, the pipe regions in the present embodiment are allocated in the packet buffer 100 corresponding to each endpoint of the peripheral connected with the USB (bus). In FIG. 6A, the pipe region PIPEa corresponds to an endpoint 1 (bulk-IN) of a peripheral 1, and the pipe region PIPEb corresponds to an endpoint 2 (bulk-OUT) of the peripheral 1. The pipe region PIPEc corresponds to an endpoint 1 (bulk-IN) of a peripheral 2, and the pipe region PIPEd corresponds to an endpoint 2 (bulk-OUT) of the peripheral 2. The pipe region PIPEe corresponds to an endpoint 1 (interrupt-IN) of a peripheral 3. The pipe region PIPE0 is a pipe region dedicated to an endpoint 0 for control transfer.

In the example shown in FIG. 6A, bulk-IN transfer is performed between the pipe region PIPEa and the endpoint 1 of the peripheral 1, and bulk-OUT transfer is performed between the pipe region PIPEb and the endpoint 2 of the peripheral 1. Bulk IN transfer is performed between the pipe region PIPEc and the endpoint 1 of the peripheral 2, and bulk-OUT transfer is performed between the pipe region PIPEd and the endpoint 2 of the peripheral 2. interrupt-IN transfer is performed between the pipe region PIPEe and the endpoint 1 of the peripheral 3.

In the present embodiment, arbitrary data transfer (isochronous transfer, bulk transfer, and interrupt transfer) can be performed between the (general-purpose) pipe region and the corresponding endpoint.

In the present embodiment, a given data unit (data unit specified by the total size) of data is transferred between the pipe region and the corresponding endpoint. As examples of the data unit, a data unit of which transfer is requested by an IRP (I/O request packet), a data unit obtained by dividing this data unit into an appropriate size, and the like can be given. Data transfer in this data unit (a series of transactions) to the endpoint may be referred to as the "pipe" in the present embodiment. A region in which data (transmission and reception data) of the "pipe" is stored is referred to as the pipe region.

When transfer in a given data unit using the pipe region terminates, the pipe region may be released. The released pipe region may be assigned to an arbitrary endpoint. In the present embodiment, correspondence between the pipe region and the endpoint can be dynamically changed.

In the present embodiment, the endpoint regions EP0 to EPe are allocated (set) in the packet buffer 100 during the peripheral operation, as shown in FIG. 6B. Data is transferred between each of the endpoint regions EP0 to EPe and the host (host controller or system memory).

In the present embodiment, the buffer regions of the packet buffer 100 are assigned to the pipe regions during the host operation and to the endpoint regions during the peripheral operation. This enables resources of the packet buffer 100 to be used commonly (used in common) during the host operation and the peripheral operation, whereby the storage capacity of the packet buffer 100 can be saved.

The number of pipe regions and endpoint regions is not limited to six. The number of pipe regions and endpoint regions may be arbitrary.

5. Transfer Condition Register (Common Register)

Figure 7:
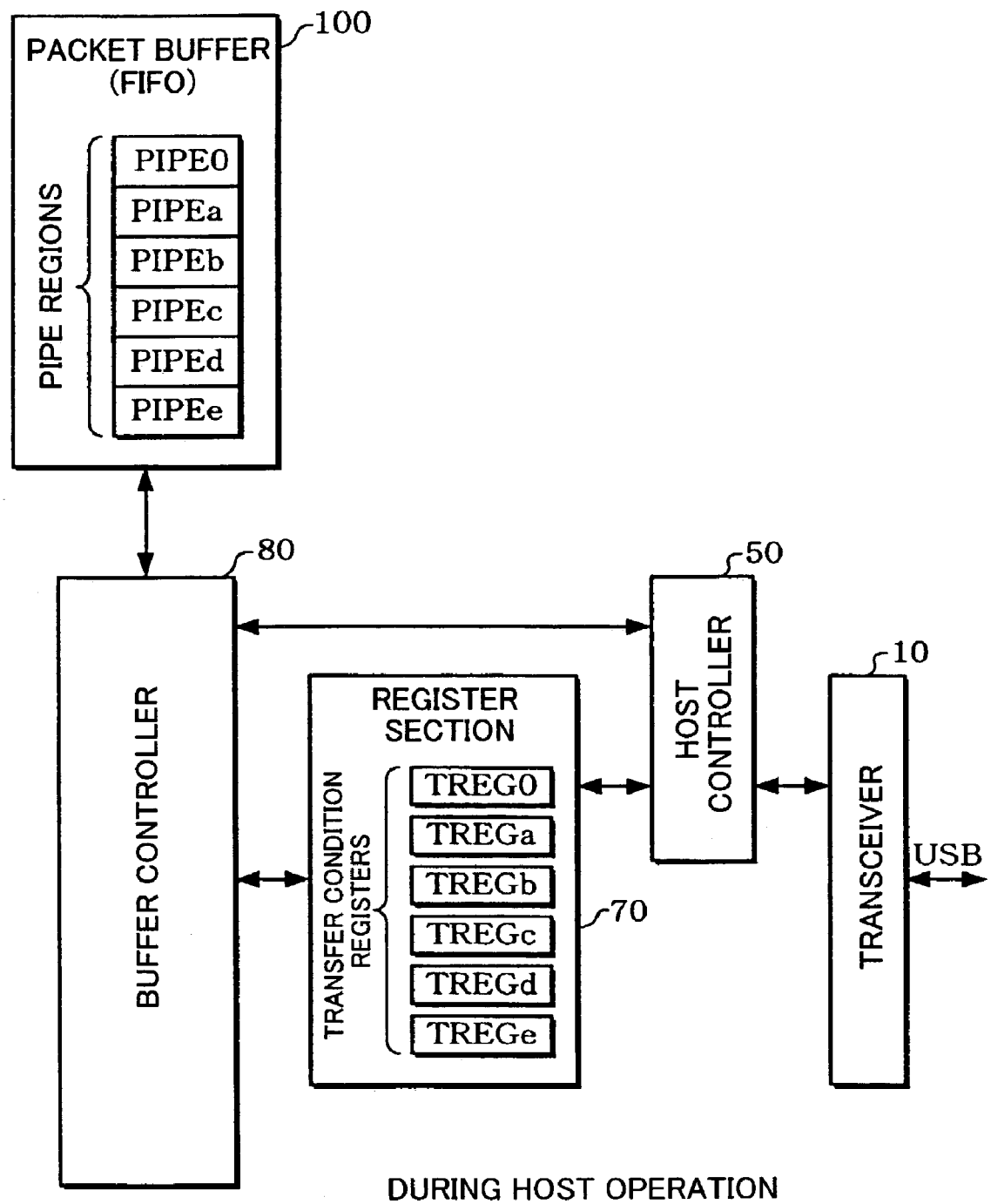
FIG. 7 describes the operation of the data transfer control device as a host.

In the present embodiment, transfer condition information on data transfer performed between the pipe regions PIPE0 to PIPEe and the endpoints is set in transfer condition registers TREG0 to TREGe during the host operation, as shown in FIG. 7. Specifically, the transfer condition information on the pipe regions PIPE0, PIPEa, PIPEb, PIPEc, PIPEd, and PIPEe is respectively set (stored) in the transfer condition registers TREG0, TREGa, TREGb, TREGc, TREGd, and TREGe. The transfer condition information is set by the firmware (CPU), for example.

The host controller (transfer controller in a broad sense) 50 generates transactions to the endpoint based on the transfer condition information set in the transfer condition registers TREG0 to TREGe. The host controller 50 automatically transfers data (packet) between the pipe region and the corresponding endpoint.

In the present embodiment, each transfer condition register is provided corresponding to each pipe region (buffer region). Pipe transfer (transfer in a given data unit) in each pipe region is automatically performed by the host controller 50 based on the transfer condition information set in each transfer condition register. Therefore, it is unnecessary for the firmware (driver, software) to take part in data transfer control until the data transfer is completed after setting the transfer condition information in the transfer condition registers. An interrupt occurs when pipe transfer in the given data unit is completed, whereby the firmware is advised of the completion of transfer. This significantly reduces the processing load of the firmware (CPU).

Figure 8:
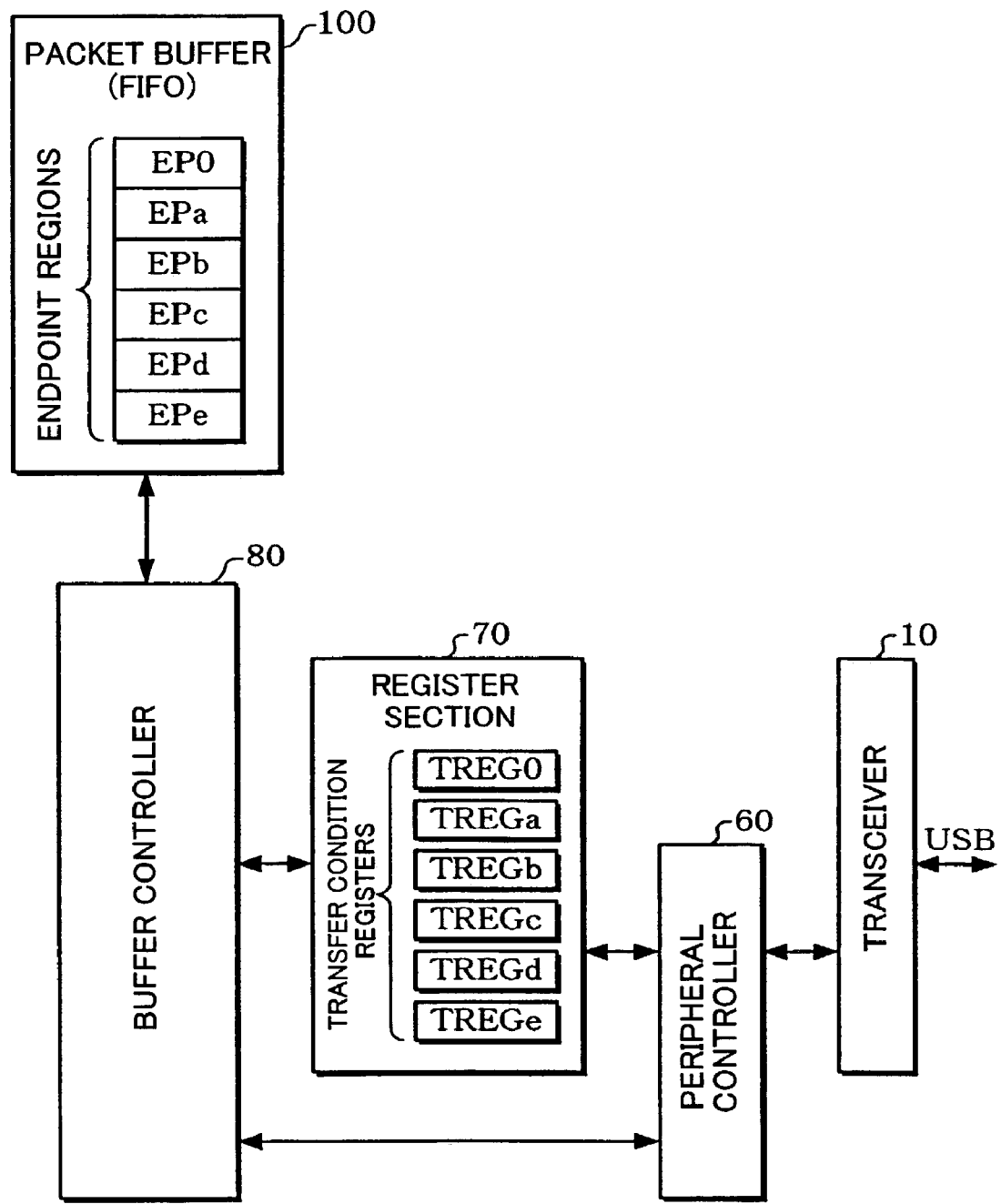
FIG. 8 describes the operation of the data transfer control device as a peripheral.

In the present embodiment, the transfer condition information on data transfer performed between the endpoint regions EP0 to EPe and the host is set in the transfer condition registers TREG0 to TREGe during the peripheral operation, as shown in FIG. 8. The peripheral controller (transfer controller in a broad sense) 60 performs data transfer between the endpoint regions and the host based on the transfer condition information set in the transfer condition registers TREG0 to TREGe.

In the present embodiment, the transfer condition registers TREG0 to TREGe are used commonly (used in common) during the host operation and the peripheral operation. This enables resources of the register section 70 to be saved, whereby the scale of the data transfer control device can be decreased.

FIG. 9 shows a configuration example of the registers in the register section 70. Some of the registers in the register section 70 may be included in each block (OTGC, HC, PC, Xcvr, and the like).

As shown in FIG. 9, the transfer condition registers (each of TREG0 to TREGe) in the register section 70 include HC/PC common registers (common transfer condition registers) which are used commonly during the host operation (HC, PIPE) and the peripheral operation (PC, EP). The transfer condition registers include HC (PIPE) registers (host transfer condition registers) which are used only during the host operation. The transfer condition registers include PC (EP) registers (peripheral transfer condition registers) which are used only during the peripheral operation. The transfer condition register also include access control registers which are registers for performing access control to the packet buffer (FIFO) and the like and are used commonly during the host operation and the peripheral operation.

For example, the host controller (HC) 50 transfers data (packet) based on the transfer condition information set in the HC/PC common registers and the HC registers during the host operation of a dual-role device.

The peripheral controller 60 (PC) transfers data (packet) based on the transfer condition information set in the HC/PC common registers and the PC registers during the peripheral operation.

The buffer controller 80 performs access control to the packet buffer 100 (generation of read/write address, read/write of data, arbitration in access, and the like) based on the common access control register during the host operation and the peripheral operation.

A data transfer direction (IN, OUT, SETUP, and the like), transfer type (transaction type such as isochronous, bulk, interrupt, and control), endpoint number (number associated with the endpoints of each USB device), and maximum packet size (maximum payload size of a packet which can be transmitted or received by the endpoint; page size) are set in the HC/PC common registers shown in FIG. 9. The page number (number of layers of the buffer region) of the buffer regions (pipe regions or endpoint region) is set in the HC/PC common registers. Information instructing whether or not to use DMA connection (whether or not to use DMA transfer by the DMA handler circuit 112 shown in FIG. 5) is set in the HC/PC common registers.

A token issue interval of interrupt transfer (interval for starting interrupt transactions) is set in the HC (PIPE) registers. The number of continuous execution times of transactions (information which sets a transfer ratio between the pipe regions; number of continuous execution times of transactions in each pipe region) is set in the HC (PIPE) registers. A function address (USB address of a function having endpoints) and the total size of data to be transferred (total size of data transferred through each pipe region; data unit such as IRP) are set in the HC (PIPE) register. A start instruction for automatic transactions (instruction requesting the host controller to start automatic transaction processing) is set in the HC (PIPE) registers. An instruction for an automatic control transfer mode (instruction for a mode which automatically generates transactions in a setup stage, data stage, and status stage of control transfer) is also set in the HC (PIPE) register.

Endpoint enable (instruction for enabling or disabling endpoint) and handshake designation (designation of a handshake performed in each transaction) are set in the PC (EP) register.

A buffer I/O port (I/O port when performing PIO transfer by the CPU) is set in the common access control register for the packet buffer (FIFO). Buffer full/empty (notification of full/empty of each buffer region) and a buffer remaining data size (remaining data size of each buffer region) are also set in the common access control register.

The register section 70 includes interrupt-related registers, block-related registers, and DMA control registers.

The interrupt-related registers include an interrupt status register for indicating the status (factor) of an interrupt to the CPU, and an interrupt enable register which sets enable and disable (unmask and mask) of an interrupt. As the interrupts, interrupts relating to the OTG controller 20, the host controller 50, and the peripheral controller 60 can be given.

The block-related registers include an interblock common register which is used commonly by the blocks, and a block register which is used in each block (Xcvr, OTGC, HC, and PC).

The interblock common register includes a register which instructs reset of each block and the like. The block register includes a register for controlling the transceiver (Xcvr) 10, a state command register for the OTG controller (OTGC) 20, a state command register for the host controller (HC) 50, a register which sets the frame number, and the like.

In the present embodiment, the registers used commonly during the host operation and the peripheral operation (HC/PC common registers and common access control registers) are provided in the register section 70. This enables the scale of the register section 70 to be decreased in comparison with the case of separately providing registers for the host operation and registers for the peripheral operation. Moreover, the access addresses of the common registers from the firmware (driver) which operates on the CPU can be the same during the host operation and the peripheral operation. Therefore, the firmware can manage the common registers using the single addresses, whereby the processing of the firmware can be simplified.

The transfer conditions characteristic of transfer during the host operation (PIPE) and transfer during the peripheral operation (EP) can be set by providing the HC registers and the PC registers. For example, a token for interrupt transfer can be issued at a desired interval during the host operation by setting the token issue interval without using the technique described with reference to FIG. 4. The transfer ratio between the pipe regions can be arbitrarily set during the host operation by setting the number of continuous execution times. The size of data automatically transferred through the pipe regions during the host operation can be arbitrarily set by setting the total size. The firmware can instruct start of automatic transactions and on/off of the automatic control transfer mode during the host operation.

FIG. 10 shows a detailed example of a register map of the general-purpose transfer condition (PIPE/EP) registers TREGa to TREGe (TREGx: x=a to e). FIG. 11 shows a detailed example of a register map of the transfer condition register TREG0 for control transfer. FIGS. 12A, 12B, and 13 show a summary of the transfer condition information (JoinDMA, FIFOClr, ToggleMode, AutoZeroLen, Buffer-Page, DirPID, TranType, EPNumber, MaxPktSize, and the like) set in each bit field of the transfer condition registers.

In FIG. 10, the access addresses 0x0, 0x1, 0x2, and 0x3 of the common registers xConfig_0, xconfig_1, xMaxPktSize_H, and xMaxPktSize_L are the same during the host operation and the peripheral operation. The same information content is set in these registers by the firmware during the host operation and the peripheral operation.

6. Automatic Transaction

Figure 14:
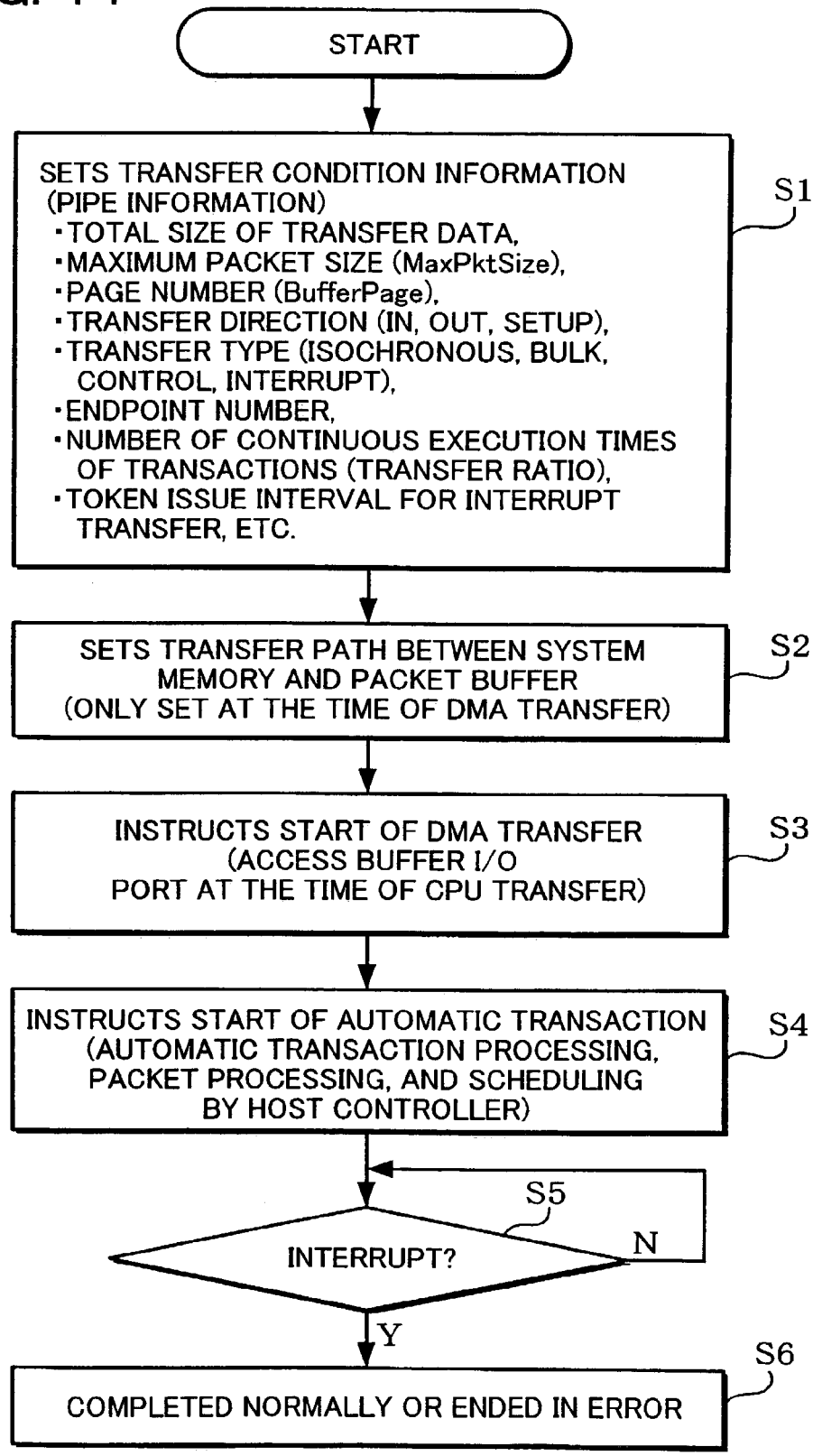
FIG. 14 is a flowchart for describing a processing example of firmware.

FIG. 14 shows an example of a flowchart of firmware processing during automatic transaction (IN, OUT) processing of the host controller 50.

The firmware (processing unit or driver) sets the transfer condition information (pipe information) in the transfer condition registers described with reference to FIG. 9 and the like (step S1). In more detail, the firmware sets the total size of data to be transferred, maximum packet size (MaxPktSize) page number (BufferPage), transfer direction (IN, OUT) or SETUP), transfer type (isochronous, bulk, control, or interrupt), endpoint number, number of continuous execution times of transactions (transfer ratio) in the pipe region, token issue interval for interrupt transfer, and the like in the transfer condition registers.

Then, the firmware sets a transfer path between the external system memory and the packet buffer 100 (step S2). Specifically, the firmware sets the DMA transfer path through the DMA handler circuit 112 shown in FIG. 5.

The firmware instructs start of DMA transfer (step S3). Specifically, the firmware activates a DMA transfer start instruction bit of the DMA control register shown in FIG. 9. In transfer by the CPU, the packet buffer 100 can be accessed by accessing the buffer I/O port shown in FIG. 9.

The firmware instructs start of automatic transactions (step S4). Specifically, the firmware activates an automatic transaction start instruction bit of the HC register (pipe register) shown in FIG. 9. This allows the host controller 50 to perform automatic transaction processing, packet processing (assembling/disassembling of packet), and scheduling processing. Specifically, the host controller 50 automatically transfers data specified by the total size in a direction (IN or OUT) specified by the transfer direction using the packet with a payload of the maximum packet size.

The order of the processing in the step S3 and the processing in the S4 is not limited. The start instruction for DMA transfer may be performed after the start instruction for automatic transactions.

Then, the firmware waits for occurrence of an interrupt notifying of the completion of pipe transfer (step S5). When an interrupt occurs, the firmware checks the interrupt status (factor) of the interrupt-related registers shown in FIG. 9. The processing is then completed normally or ends in error (step S6).

According to the present embodiment, the firmware merely sets the transfer condition information for each pipe region (step S1), instructs start of DMA transfer (step S3), and instructs start of automatic transactions (step S4). The subsequent data transfer processing is automatically performed by the hardware circuit of the host controller 50. Therefore, the processing load of the firmware is reduced in comparison with the technique conforming to the OHCI described with reference to FIGS. 3A, 3B, and 4, whereby a data transfer control device suitable for portable equipment having a low performance CPU can be provided.

Figure 15:
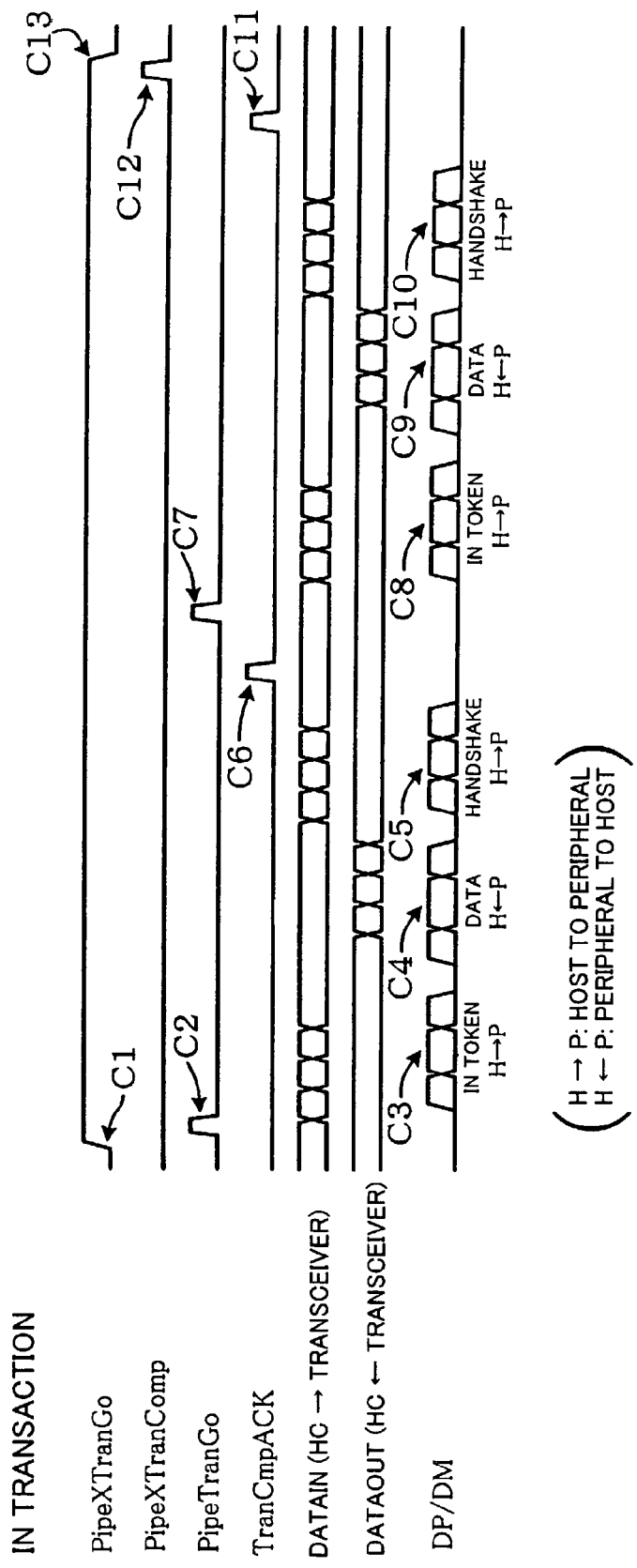
FIG. 15 is an example of a signal waveform of automatic transaction processing in the case of IN transactions.
Figure 16:
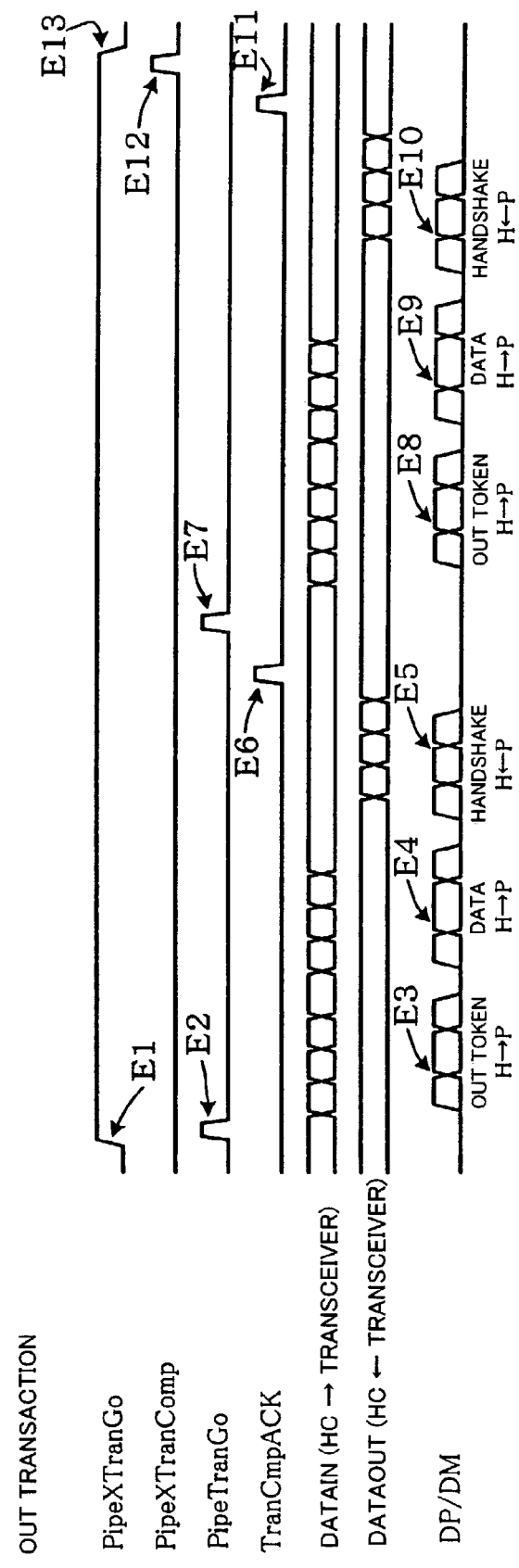
FIG. 16 is an example of a signal waveform of automatic transaction processing in the case of OUT transactions.

FIGS. 15 and 16 show examples of a signal waveform during automatic transaction processing by the host controller 50. In FIGS. 15 and 16, "H→P" indicates that the packet is transferred from the host to the peripheral and "H←P" indicates that the packet is transferred from the peripheral to the host.

FIG. 15 is an example of a signal waveform in the case of IN transactions (transfer type is IN).

When the firmware instructs start of automatic transactions in the step S4 shown in FIG. 14, PipeXTranGo (transfer request signal for PipeX from the firmware) goes active as indicated by C1 shown in FIG. 15. This allows the host controller 50 to start automatic transaction processing for PipeX (X=0 to e).

When PipeTranGo (transfer request signal from an HC sequence management circuit in the host controller 50) goes active as indicated by C2, the host controller 50 generates an IN token packet and transfers the packet to the peripheral through the USB as indicated by C3. When an IN data packet is transferred from the peripheral to the host controller 50 as indicated by C4, the host controller 50 generates a handshake packet (ACK) and transfers the handshake packet to the peripheral as indicated by C5. This causes TranCmpACK to go active as indicated by C6.

When PipeTranGo goes active as indicated by C7, packet transfers indicated by C8, C9, and C10 are performed, whereby TranCmpACK goes active as indicated by C11. This causes PipeXTranComp (transfer completion notification signal in a data unit of IRP to the firmware) to go active as indicated by C12. The firmware is notified of the completion of transfer for the pipe by the interrupt of PipeXTranComp.

When PipeXTranComp goes active, PipeXTranGo goes inactive as indicated by C13, thereby indicating that the pipe is in a non-transfer state.

FIG. 16 is an example of a signal waveform in the case of OUT transactions (transfer type is OUT).

When the firmware instructs start of automatic transactions, PipeXTranGo goes active as indicated by E1 and PipeTranGo goes active as indicated by E2. The host controller 50 transfers an OUT token packet to the peripheral as indicated by E3 and transfers an OUT data packet as indicated by E4. When the handshake packet (ACK) returns from the peripheral as indicated by E5, TranCmpACK goes active as indicated by E6.

When PipeTranGo goes active as indicated by E7, packet transfers indicated by E8, E9, and E10 are performed, whereby TranCmpACK goes active as indicated by E11. PipeXTranComp then goes active as indicated by E12. The firmware is notified of the completion of transfer for the pipe by the interrupt of PipeXTranComp. When PipeXTranComp goes active, PipeXTranGo goes inactive as indicated by E13.

7. Number of Continuous Execution Times of Transactions

In the present embodiment, the number of continuous execution times of transactions (pipe transfers) (transfer ratio information between a plurality of pipe regions in a broad sense) may be set in the transfer condition register. In more detail, the number of continuous execution times is set in the HC transfer condition register as described with reference to FIG. 9.

In FIG. 17A, the number of continuous execution times of transactions in the pipe regions PIPEa, PIPEb, and PIPEc is set to "1", for example. In this case, automatic data transfer is sequentially performed in the pipe regions PIPEa, PIPEb, PIPEc, PIPEa, PIPEb, PIPEc . . . at the same transfer ratio.

In FIG. 17B, the number of continuous execution times of transactions in the pipe regions PIPEa and PIPEc is respectively set to "3" and "2". In this case, automatic data transfer is sequentially performed in the pipe regions PIPEa, PIPEa, PIPEa, PIPEb, PIPEc, PIPEc, PIPEa, PIPEa, PIPEa . . . . Specifically, the transfer ratio (relative ratio of pipe transfers) in the pipe regions PIPEa, PIPEb, and PIPEc is set to 3:1:2.

Therefore, in the case where the total sizes of data transferred in the pipe regions PIPEa and PIPEc are larger than the total size of data transferred in the pipe region PIPEb, data can be efficiently transferred in the pipe regions PIPEa and PIPEc, whereby data transfer can be efficiently scheduled.

In the example shown in FIG. 17B, data in the pipe regions PIPEa and PIPEc may not be automatically transferred. Specifically, data may be automatically transferred in the pipe regions PIPEa, PIPEb, PIPEc, PIPEa, PIPEc, PIPEa . . . in that order, for example. This also enables the transfer ratio in the pipe regions PIPEa, PIPEb, and PIPEc to be set to 3:1:2.

8. Token Issue Interval for Interrupt Transfer

The USB standard defines four types of transfer techniques. In interrupt transfer which is one of the four transfer techniques, polling for a peripheral (device) is performed by allowing the host to periodically issue tokens.

In the data transfer control device conforming to the conventional OHCI, the firmware must create the descriptors having a binary tree structure shown in FIG. 4 in order to set a token issue interval for interrupt transfer. This increases the processing load of the firmware.

In the present embodiment, the token issue interval for interrupt transfer is directly set in the transfer condition register in a frame order (ms), for example. In more detail, the token issue interval is set in the HC transfer condition register as described with reference to FIG. 9.

When the firmware (processing unit) sets the token issue interval in the transfer condition register, the host controller 50 (transfer controller) automatically issues token packets for interrupt transfer at the token issue interval set by the firmware and transfers the packets to the peripheral.

In the present embodiment, transfer to one endpoint is managed as the pipe (one transfer order). The firmware determines the pipe in which interrupt transfer is performed, and directly sets the token issue interval in the transfer condition register of this pipe by using a numerical value. The host controller 50 issues tokens for interrupt transfer at the token issue interval set by the firmware in this pipe (pipe region).

In FIG. 18A, "1" is set in a token issue interval register (one of the transfer condition registers), for example. In this case, the host controller 50 automatically transfers token packets for interrupt transfer at an interval of one frame. In FIGS. 18B and 18C, "2" and "4" are respectively set in the token issue interval register. In these case, token packets are automatically transferred at an interval of two frames-and four frames, respectively.

This eliminates the need to create the descriptors having a binary tree structure shown in FIG. 4 in order to realize the interrupt transfer, whereby the processing load of the firmware can be reduced.

In the OHCI, the descriptors having a binary tree structure shown in FIG. 4 are employed so as to be able to deal with the case where a number of endpoints are connected with the USB.

However, since peer-to-peer connection is planned in OTG in many cases, use of the descriptors having a binary tree structure shown in FIG. 4 wastes the processing.

The present embodiment is configured so that the token issue interval can be directly set in each transfer condition register while eliminating such a processing waste and utilizing the transfer condition registers provided for each of the pipe regions.

9. Detailed Configuration Example of Each Block

Detailed configuration examples of each block are described below.

9.1 OTG Controller

Figure 19:
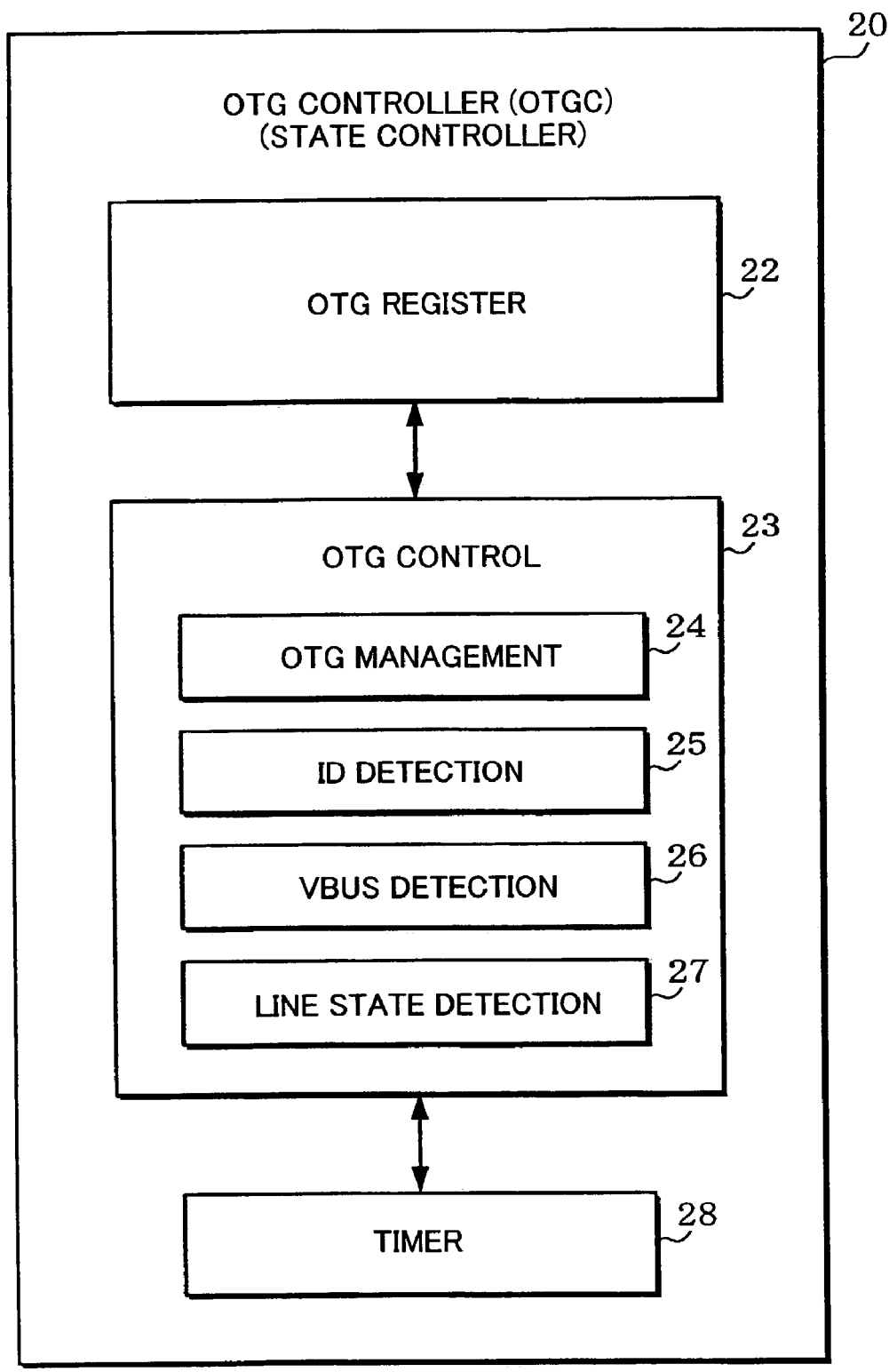
FIG. 19 shows a detailed configuration example of an OTG controller.

FIG. 19 shows a configuration example of the OTG controller 20.

The OTG controller 20 includes an OTG register section 22. The OTG register section 22 includes a monitor register and a control register of the OTG controller 20. The OTG register section 22 also includes a circuit for decoding the OTG state commands written by the firmware (CPU).

The OTG controller 20 includes an OTG control circuit 23. The OTG control circuit 23 includes an OTG management circuit 24 which manages the OTG state, an ID detection circuit 25 which detects the voltage level of the ID pin, a VBUS detection circuit 26 which detects the voltage level of VBUS, and a line state detection circuit 27 which detects the line states of DP and DM.

The OTG controller 20 includes a timer 28 for measuring time which is one of the transition judgment conditions for the OTG state.

Information which must be detected to allow the OTG state to transit is the voltage levels of ID and VBUS and the line state of DP/DM. The OTG controller 20 in the present embodiment detects this information and transfers it to the firmware (CPU) through the monitor register.

The firmware transits the state thereof based on the detected information and transfers the next transition state to the OTG controller 20 by using the OTG state commands.

The OTG controller 20 decodes the OTG state commands and performs drive control of VBUS, connection control of the pull-up/pull-down resistor, and the like based on the decoded results, thereby realizing SRP and HNP described with reference to FIGS. 2A and 2B.

In the present embodiment, since the OTG controller 20 performs OTG control for each state, the firmware concentrates on state transition management. As a result, the processing load of the firmware (CPU) can be reduced in comparison with the case of realizing all the state controls by the firmware. Moreover, the firmware can be efficiently developed.

The hardware circuit may judge the OTG state transition instead of the firmware. Almost the entire processing of the OTG controller 20 (processing other than VBUS control, pull-up/pull-down resistor control, ID detection, VBUS detection, and line state detection) may be realized by the firmware (software).

9.2 Host Controller and Peripheral Controller

Figure 20A:
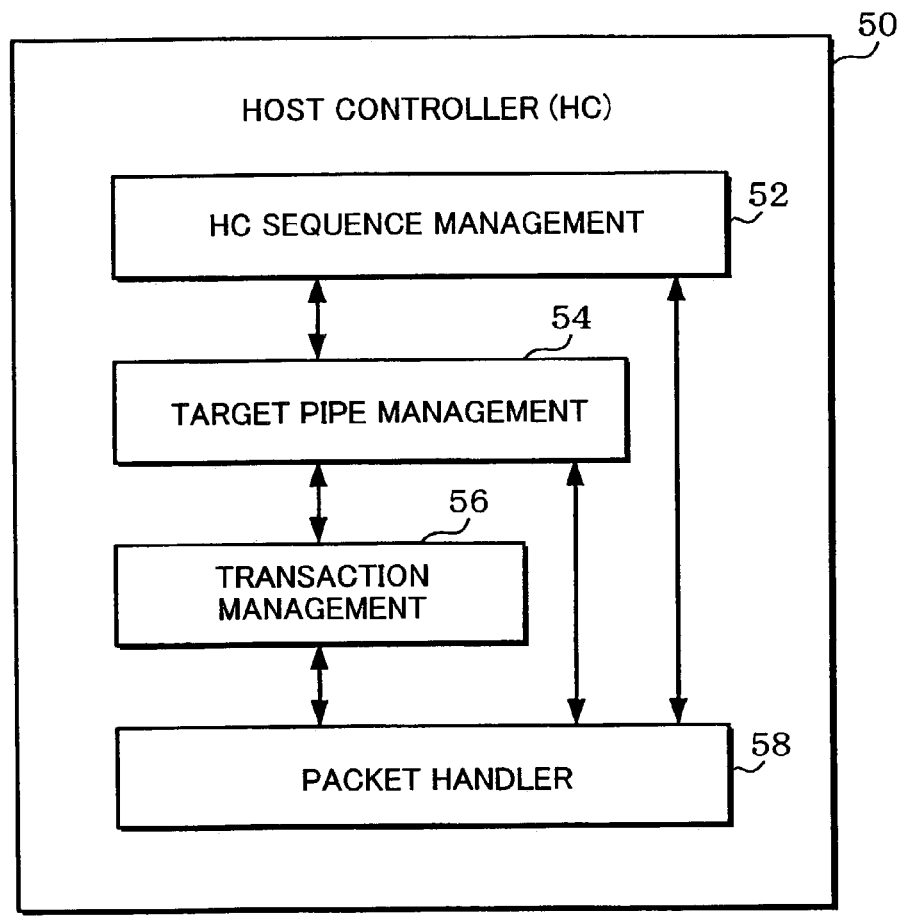
FIGS. 20A and 20B show detailed configuration examples of a host controller and a peripheral controller.

FIG. 20A shows a configuration example of the host controller 50.

The host controller 50 includes an HC sequence management circuit 52. The HC sequence management circuit 52 intervenes in pipe transfer (data transfer using the pipe region) and performs time management, scheduling of pipe transfer, resend management, and the like.

In more detail, the HC sequence management circuit 52 counts the frame number, instructs transmission of a Start-Of-Frame (SOF) packet, and the like. The HC sequence management circuit 52 performs processing for preferentially executing isochronous transfer at the head of each frame and processing for preferentially handling interrupt transfer next to isochronous transfer. The HC sequence management circuit 52 performs processing for instructing each pipe transfer according to the order of pipe transfer. The HC sequence management circuit 52 manages the number of continuous execution times of transactions and confirms the remaining frame time. The HC sequence management circuit 52 processes the handshake packet (ACK or NAK) returned from the peripheral. The HC sequence management circuit 52 also performs error processing during the transactions.

The host controller 50 includes a target pipe management circuit 54. The target pipe management circuit 54 performs handing processing of the transfer condition information set in the transfer condition registers of the register section 70 and the like.

In more detail, the target pipe management circuit 54 selects the transfer condition information and generates an interrupt signal. The target pipe management circuit 54 loads the total size of data to be transferred in the pipe region when start of automatic transactions is instructed. The target pipe management circuit 54 performs count (decrement) processing of the remaining transfer data size. The target pipe management circuit 54 confirms the state of the buffer (FIFO) region when transmitting data to or receiving data from the buffer controller 80. The target pipe management circuit 54 instructs a transaction management circuit 56 to transfer data. The target pipe management circuit 54 processes judging of reception of an unexpected short packet and processes judging of reception of a packet having a size larger than the maximum packet size. In the case where a mode in which a zero-length packet is automatically transferred is set, the target pipe management circuit 54 instructs the transaction management circuit 56 to transmit the final zero-length packet. The target pipe management circuit 54 performs sequence management in an automatic control transfer mode.

The host controller 50 includes the transaction management circuit 56. The transaction management circuit 56 manages types of packets to be transferred and the order of transfer (sequence management of transactions). The transaction management circuit 56 monitors time-outs. The transaction management circuit 56 advises completion of the transactions.

The host controller 50 includes a packet handler circuit 58. The packet handler circuit 58 processes assembly/disassembly of the packet. The packet handler circuit 58 checks PID and decodes/encodes CRC. The packet handler circuit 58 reads/writes the payload of the packet in the buffer region and transmits the SOF packet. The packet handler circuit 58 counts transmission and reception data.

Figure 20B:
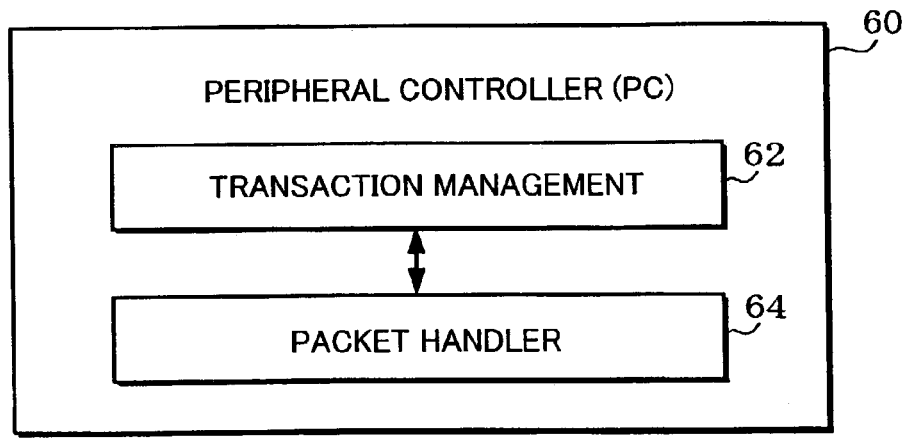

FIG. 20B shows a configuration example of the peripheral controller 60.

The peripheral controller 60 includes a transaction management circuit 62 and a packet handler circuit 64. The transaction management circuit 62 and the packet handler circuit 64 perform processing almost the same as the processing of the transaction management circuit 56 and the packet handler circuit 58 of the host controller 50.

9.3 Buffer Controller

Figure 21:
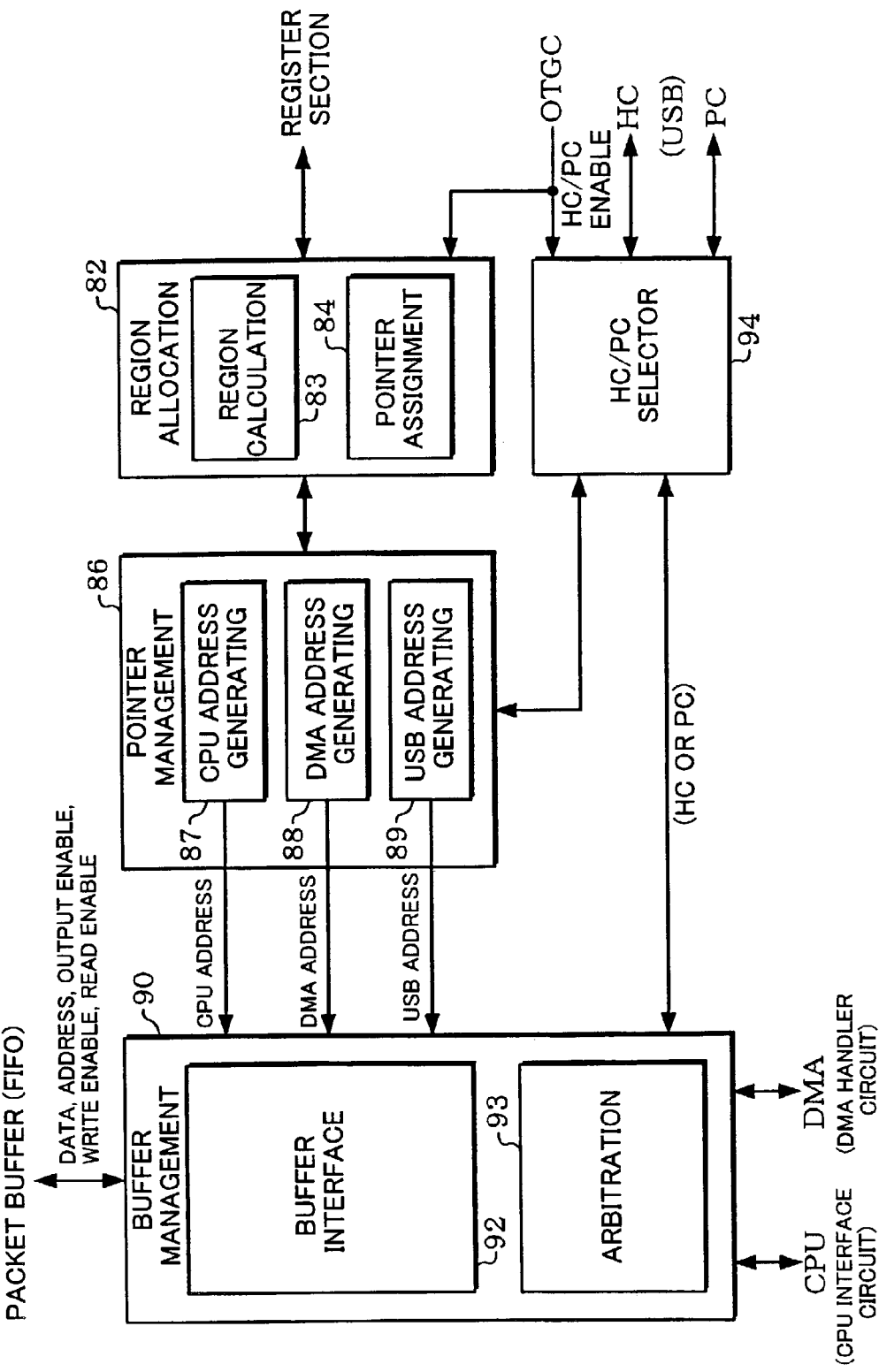
FIG. 21 shows a detailed configuration example of a buffer controller.

FIG. 21 shows a configuration example of the buffer controller 80.

The buffer controller 80 includes a region allocation circuit 82. The region allocation circuit 82 is a circuit which allocates the buffer regions (regions which are set as the pipe regions during the host operation and as the endpoint regions during the peripheral operation) in the packet buffer 100.

The region allocation circuit 82 includes a region calculation circuit 83. The region calculation circuit 83 is a circuit which calculates the size, start address, and end address of the buffer regions and the like based on the maximum packet size (page size in a broad sense) and the page number.

Figures 22A, 22B, 22C:
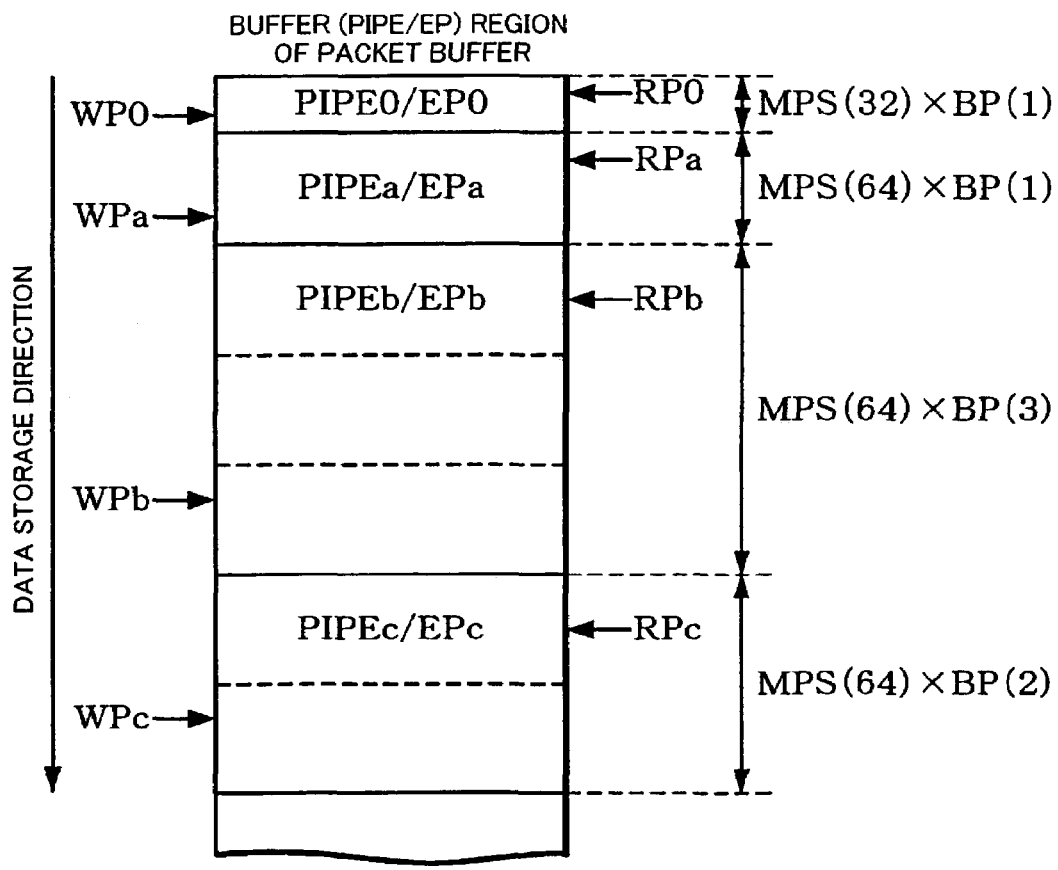
FIGS. 22A, 22B, and 22C describe a region allocation technique and a pointer assignment technique.

For example, in the buffer regions PIPE0/EP0, PIPEa/EPa, PIPEb/EPb, and PIPEc/EPc shown in FIG. 22A, the maximum packet size (MaxPktSize) is respectively set to 32, 64, 64, and 64 bytes and the page number (BufferPage) is respectively set to 1, 1, 3, and 2 pages. The region calculation circuit 83 calculates the size, start address, and end address of the buffer regions PIPE0/EP0 to PIPEc/EPc based on the maximum packet size, the page number, and the like. For example, the sizes of the buffer regions PIPE0/EP0, PIPEa/EPa, PIPEb/EPb, and PIPEc/EPc shown in FIG. 22A are respectively 32 (=32×1), 64 (=64×1), 192 (=64×3), and 128 (=64×2) bytes.

A pointer assignment circuit 84 is a circuit which assigns a write pointer WP (WP0, WPa, WPb, and WPc) and a read pointer RP (RP0, RPa, RPb, and RPc) of each buffer region to a DMA pointer, a CPU pointer, and a USB pointer.

As shown in FIG. 22B, when transmitting data (when data is transferred from DMA or CPU to USB through the packet buffer 100) using DMA transfer, the write pointer WP of the buffer region is assigned to the DMA (DMA access) pointer and the read pointer RP is assigned to the USB (USB access) pointer. When transmitting data using CPU (PIO) transfer, the write pointer WP of the buffer region is assigned to the CPU (CPU access) pointer and the read pointer RP is assigned to the USB pointer.

As shown in FIG. 22C, when receiving data (when data is transferred from USB to DMA or CPU through the packet buffer 100) using DMA transfer, the write pointer WP of the buffer region is assigned to the USB pointer and the read pointer RP is assigned to the DMA pointer. When receiving data using CPU transfer, the write pointer WP of the buffer region is assigned to the USB pointer and the read pointer RP is assigned to the CPU pointer.

The pointer information (positional information) of the write pointer WP and the read pointer RP of each buffer region is retained in each transfer condition register (PIPE/EP register) in the register section 70.

A pointer management circuit 86 is a circuit which generates an actual address for accessing the packet buffer 100 while updating the pointers.

The pointer management circuit 86 includes a CPU address generating circuit 87, a DMA address generating circuit 88, and a USB address generating circuit 89. These circuits 87, 88, and 89 respectively generate the CPU address, the DMA address, and the USB address based on the CPU pointer, the DMA pointer, and the USB pointer assigned by the pointer assignment circuit 84. The pointer management circuit 86 updates the pointers accessed each time from the CPU (CPU interface circuit) or the DMA (DMA handler circuit) or each time transactions of the USB (HC or PC) is completed (transmission or reception of the handshake such as ACK or NAK). The pointer information after updating is written into each transfer condition register in the register section 70 through the region allocation circuit 82.

A buffer management circuit 90 is a circuit which manages access to the packet buffer 100.

The buffer management circuit 90 includes a buffer interface circuit 92. The buffer interface circuit 92 inputs/outputs data to or from the packet buffer 100 and outputs the address, output enable, write enable, read enable, and the like upon receiving the CPU address, the DMA address, the USB address, and the like from the pointer management circuit 86. The buffer management circuit 90 includes an arbitration circuit 93. The arbitration circuit 93 is a circuit which intervenes in access from the CPU (CPU interface circuit), DMA (DMA handler circuit), and USB (host controller or peripheral controller) One of the CPU address, the DMA address, and the USB address is output as the access address of the packet buffer 100 based on the results of intervention, whereby the data transfer path between the CPU, DMA or USB and the packet buffer 100 is set.

An HC/PC selector 94 switches connection between the buffer management circuit 90 (buffer controller 80) and the host controller (HC) 50 or the peripheral controller (PC) 60. For example, the HC/PC selector 94 connects the host controller 50 with the buffer management circuit 90 during the host operation, and connects the peripheral controller 60 with the buffer management circuit 90 during the peripheral operation. The HC/PC selector 94 switches connection based on the HC/PC enable signal from the OTG controller 20 (OTGC).

10. Processing of Firmware

A detailed example of the processing of the firmware (processing unit) is described below.

Figure 23:
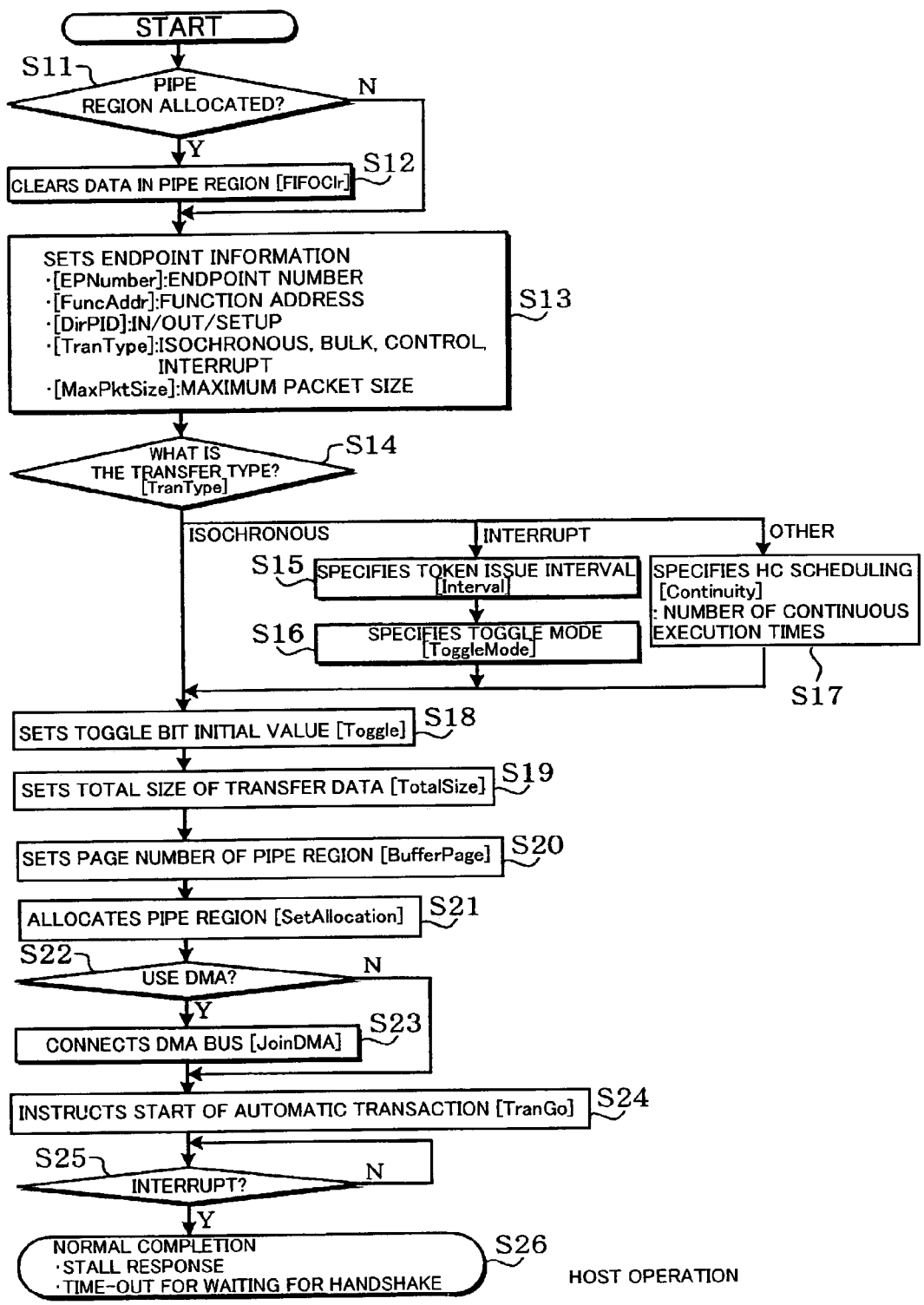
FIG. 23 is a flowchart showing a detailed processing example of the firmware during the host operation.

FIG. 23 is a flowchart of the processing of the firmware during the host operation.

The firmware first confirms whether or not the pipe (buffer) regions have been allocated (step S11). If the pipe regions have been allocated, the firmware instructs data clear [FIFOClr] of the pipe regions (step S12).

The firmware then sets the endpoint (transfer condition) information in the transfer condition register (step S13). Specifically, the firmware sets the endpoint number [EPNumber], function address [FuncAddr], transfer direction [DirPID] such as IN/OUT/SETUP, transfer type [TranType] such as isochronous, bulk, control, and interrupt, maximum packet size [MaxPktSize] and the like.

Then, the firmware judges the transfer type [TranType] (step S14). If the transfer type is isochronous, the firmware moves to a step S18. If the transfer type is interrupt, the firmware specifies the token issue interval [Interval] and the toggle mode [ToggleMode] (steps S15 and S16). If the transfer type is neither isochronous nor interrupt (bulk or control), the firmware specifies scheduling of HC [number of continuous execution times: Continuity] (step S17).

Then, the firmware sets the initial value [Toggle] of the toggle bit and the total size [TotalSize] of data to be transferred (steps S18 and S19) In the case of isochronous transfer, it is unnecessary to set the initial value of the toggle bit. The order of the steps S13 to S19 is arbitrary.

Then, the firmware sets the page number [BufferPage] of the pipe (buffer) region (step S20), and instructs allocation of the pipe region [SetAllocation] (step S21).

Then, the firmware judges whether or not to use the DMA (step S22). If the DMA is used, the firmware instructs connection of the DMA bus [JoinDMA] (step S23). The firmware instructs start of automatic transactions [TranGo] (step S24).

Then, the firmware waits for occurrence of an interrupt (step S25), and completes normally, returns STALL, performs time-out processing for waiting for a handshake, or the like (step S26).

Figure 24:
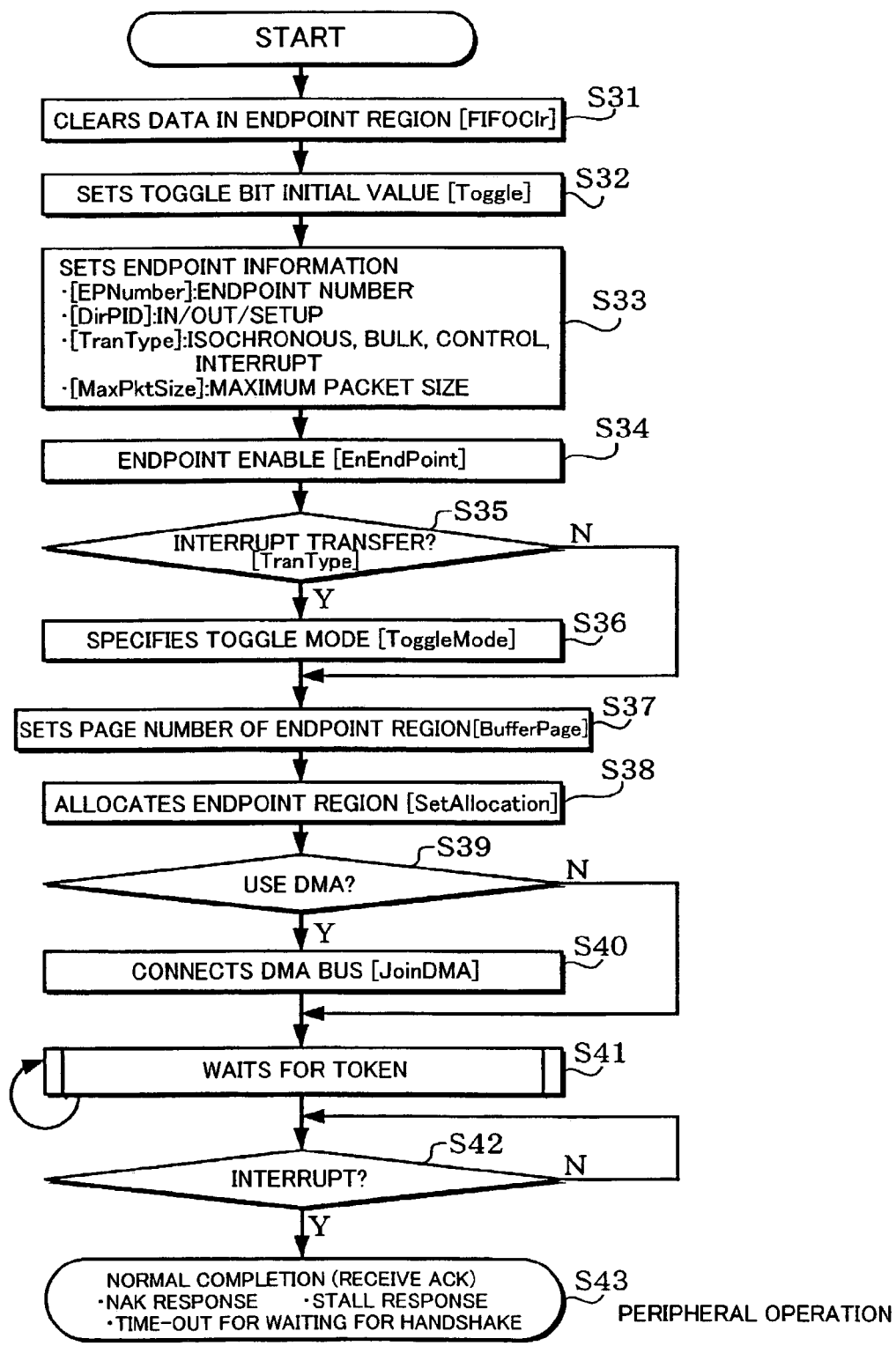
FIG. 24 is a flowchart showing a detailed processing example of the firmware during the peripheral operation.

FIG. 24 is a flowchart of the processing of the firmware during the peripheral operation.

The firmware first instructs data clear [FIFOClr] of the endpoint (buffer) region (step S31). The firmware sets the initial value [Toggle] of the toggle bit (step S32).

The firmware then sets the endpoint (transfer condition) information (step S33). Specifically, the firmware sets the endpoint number [EPNumber], transfer direction [DirPID], transfer type [TranType], maximum packet size [MaxPktSize], and the like.

Then, the firmware instructs endpoint enable [EnEndPoint] (step S34). The firmware judges the transfer type [TranType] (step S35). If the transfer type is interrupt, the firmware specifies the toggle mode [ToggleMode] (step S36).

Then, the firmware sets the page number [BufferPage] of the endpoint (buffer) region (step S37), and instructs allocation of the endpoint region [SetAllocation] (step S38).

Then, the firmware judges whether or not to use the DMA, and instructs connection of the DMA bus [JoinDMA] if the DMA is used (steps S39 and S40).

Then, the firmware waits for a token from the host (step S41). The firmware waits for occurrence of an interrupt (step S42), and completes normally (receives ACK), responds NAK, responds STALL, performs time-out processing for waiting for a handshake, or the like (step S43).

11. Electronic Equipment

Examples of electronic equipment including the data transfer control device in the present embodiment are described below.

Figure 25A:
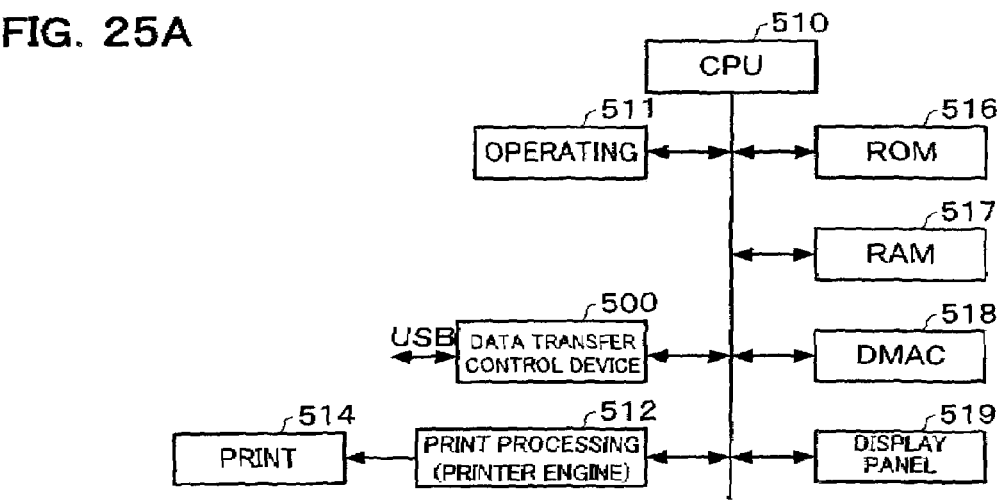
FIGS. 25A, 25B, and 25C show examples of internal block diagrams of various types of electronic equipment.
Figure 26A:
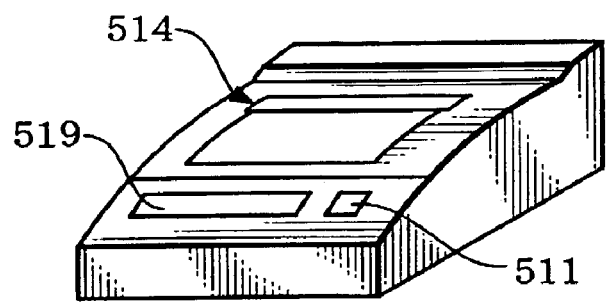
FIGS. 26A, 26B, and 26C show examples of external views of various types of electronic equipment.

FIG. 25A is an internal block diagram of a printer which is an example of the electronic equipment. FIG. 26A is an external view of the printer. A CPU (processing unit) 510 controls the entire system and the like. An operating section 511 allows the user to operate the printer. A control program, fonts, and the like are stored in a ROM 516. A RAM 517 (system memory) functions as a work area for the CPU 510. A DMAC 518 is a DMA controller for transferring data without passing through the CPU 510. A display panel 519 informs the user of the operation state of the printer.

Serial print data (print data and image data) sent from another device such as a personal computer, a digital camera, or a digital video camera through the USB is converted into parallel print data by a data transfer control device 500. The converted parallel print data is sent to a print processing section (printer engine) 512 by the CPU 510 or the DMAC 518. The parallel print data is subjected to given processing in the print processing section 512 and output and printed on paper by a print section (device for performing output processing of data) 514 consisting of a print head and the like.

Figure 25B:
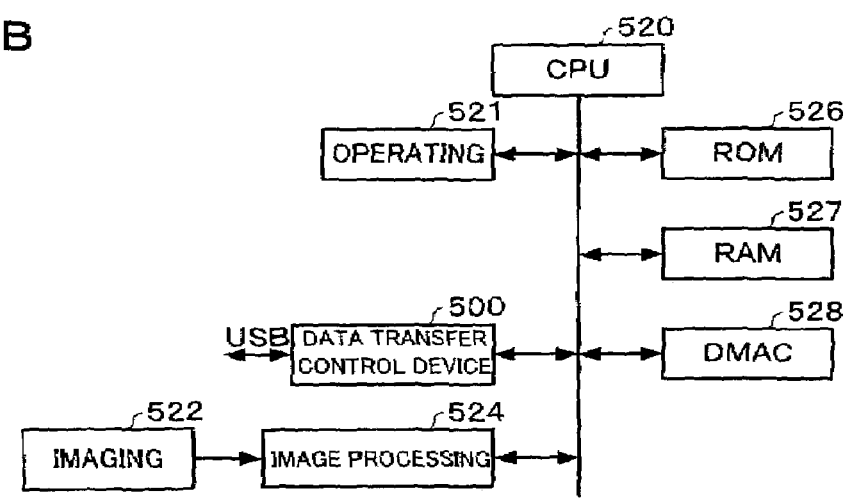
Figure 26B:
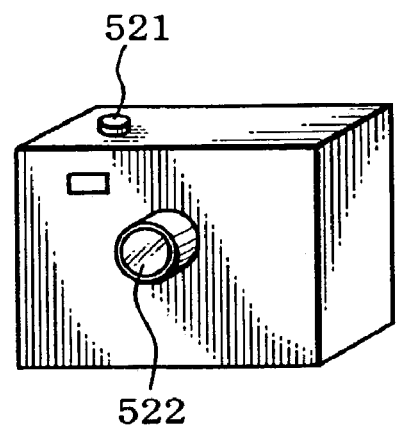

FIG. 25B shows an internal block diagram of a digital camera which is another example of electronic equipment. FIG. 26B is an external view of the digital camera. A CPU 520 controls the entire system and the like. An operating section 521 (shutter button, operating button, and the like) allows the user to operate the digital camera. A control program and the like are stored in a ROM 526. A RAM 527 functions as a work area for the CPU 520. A DMAC 528 is a DMA controller.

An image is taken by an imaging section (device for fetching data) 522 consisting of a CCD, lens, and the like. The image data is processed by an image processing section 524. The image data after processing is sent to the data transfer control device 500 by the CPU 520 or the DMAC 528. The data transfer control device 500 converts the parallel image data into serial data and sends the serial data to another device such as a printer, a storage device, or a personal computer through the USB.

Figure 25C:
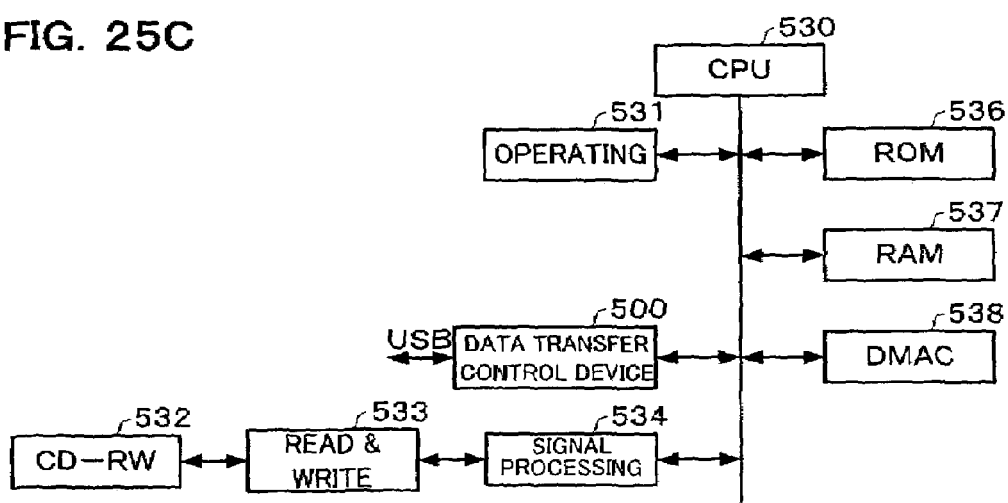
Figure 26C:
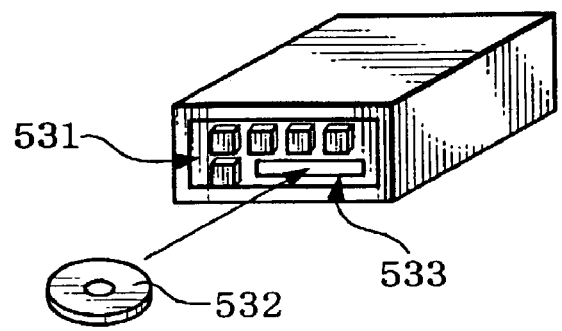

FIG. 25C is an internal block diagram of a CD-RW drive (storage device) which is still another example of electronic equipment. FIG. 26C is an external view of the CD-RW drive. A CPU 530 controls the entire system and the like. An operating section 531 allows the user to operate the CD-RW. A control program and the like are stored in a ROM 536. A RAM 537 functions as a work area for the CPU 530. A DMAC 538 is a DMA controller.

Data read from a CD-RW 532 by a read/write section (device for performing fetch processing or storage processing of data) 533 consisting of a laser, motor, optical system, and the like is input to a signal processing section 534 and subjected to given signal processing such as error correction processing. The data subjected to the signal processing is sent to the data transfer control device 500 by the CPU 530 or the DMAC 538. The data transfer control device 500 converts this parallel data into serial data and sends the serial data to another device through the USB.

Serial data sent from another device through the USB is converted into parallel data by the data transfer control device 500. This parallel data is sent to the signal processing section 534 by the CPU 530 or the DMAC 538. The parallel data is subjected to given processing in the signal processing section 534 and stored on the CD-RW 532 by the read/write section 533.

In FIGS. 25A, 25B, and 25C, a CPU for controlling data transfer by the data transfer control device 500 may be provided in addition to the CPU 510, 520 or 530.

Electronic equipment having the OTG functions can be realized by using the data transfer control device of the present embodiment in electronic equipment. Specifically, electronic equipment can be allowed to perform the role as a host or a device, whereby new types of applications can be created.

If the data transfer control device of the present embodiment is used in electronic equipment, processing load of the CPU (processing unit) incorporated in the electronic equipment is reduced, thereby enabling use of an inexpensive CPU. Moreover, the CPU can afford to perform processing other than data transfer control processing, whereby an increase in performance of the electronic equipment and reduction of cost can be achieved. Furthermore, a program of the firmware which operates on the CPU can be simplified, whereby the development period of the electronic equipment can be decreased.

As other examples of electronic equipment to which the data transfer control device of the present embodiment can be applied, various types of optical disk drives (CD-ROM and DVD), magneto-optical disk drives (MO), hard disk drives, digital video cameras, portable telephones, scanners, TVs, VTRs, audio equipment, telephones, projectors, personal computers, electronic notebooks, word processors, and the like can be given.

The present invention is not limited to the present embodiment. Various modifications and variations are possible within the spirit and scope of the present invention.

For example, the configuration of the data transfer control device of the present invention is not limited to the configuration described with reference to FIG. 5 and the like. Various modifications and variations are possible.

The configuration of each block (HC, PC, OTGC, and the like) of the data transfer control device is not limited to the configuration described in the present embodiment. Various modifications and variations are possible.

The transfer condition information set in the transfer condition register is not limited to the information described in the present embodiment.

The terms (OTG controller, CPU and firmware, host controller and peripheral controller, USB, number of continuous execution times, pipe region and endpoint region, and the like) cited in the description in the specification as the terms in a broad sense (state controller, processing unit, transfer controller, bus, transfer rate information, buffer region, and the like) may be replaced by the terms in a broad sense in another description in the specification.

The invention according to the dependent claims may have a configuration in which some of the constituent elements of the claim on which the invention is dependent are omitted. It is possible to allow the feature of the invention according to one independent claim to depend on another independent claim.

The present embodiment illustrates the application example for the USB OTG standard. However, application of the present invention is not limited to the OTG standard. For example, the present invention may be applied to data transfer in a standard based on the same idea as the OTG standard and a standard developed from the OTG standard.

What is claimed is:

1. A data transfer control device for data transfer through a bus, comprising:
    a buffer controller which controls access to a packet buffer including a plurality of pipe regions, each of the pipe regions being allocated corresponding to each of a plurality of endpoints at a host operation and data transferred to and from each of the endpoints being stored in each of the pipe regions;
    a register section including a plurality of transfer condition registers, transfer condition information on data transfer between each of the pipe regions and each of the endpoints being set in the transfer condition registers, and
    a transfer controller which automatically generates a transaction for each of the endpoints based on the transfer condition information set in the transfer condition registers and automatically transfers data between each of the pipe regions and corresponding each of the endpoints.

2. The data transfer control device as defined in claim 1, wherein the transfer condition information set in the transfer condition registers includes a total size of data transferred to and from each of the endpoints, a maximum packet size, and a data transfer direction, and
    wherein the transfer controller automatically transfers data of the total size between each of the pipe regions and corresponding each of the endpoints by using a packet with a payload of the maximum packet size in a direction specified by the transfer direction.

3. The data transfer control device as defined in claim 1,
wherein the transfer condition information set in the transfer condition registers includes a transfer type of data transfer, and
wherein the transfer controller automatically transfers data in each of the pipe regions by means of data transfer of the transfer type set in the transfer condition registers.

4. The data transfer control device as defined in claim 1,
wherein the transfer condition information set in the transfer condition registers includes transfer ratio information between the pipe regions, and
wherein the transfer controller automatically transfers data in each of the pipe regions at a transfer ratio set by the transfer ratio information.

5. The data transfer control device as defined in claim 4,
wherein the transfer ratio information is the number of continuous execution times of transactions relating to each of the pipe regions.

6. The data transfer control device as defined in claim 1,
wherein the transfer condition information set in the transfer condition registers includes a token issue interval for interrupt transfer, and
wherein the transfer controller automatically transfers a token packet for interrupt transfer at the token issue interval set in the transfer condition registers.

7. The data transfer control device as defined in claim 1,
wherein the pipe regions include a pipe region dedicated to an endpoint for control transfer among the endpoints and a general-purpose pipe region capable of being assigned to arbitrary one of the endpoints.

8. The data transfer control device as defined in claim 1, further comprising:
an interface circuit which transfers data between another bus, which is different from the bus, and the packet buffer,
wherein the interface circuit transfers data through the other bus and the transfer controller transfers data through the bus when a processing unit instructs the interface circuit and the transfer controller to start data transfer, and the transfer controller generates an interrupt for the processing unit when the data transfer is completed.

9. The data transfer control device as defined in claim 1, further comprising:
a state controller which controls a plurality of states including a state of a host operation, in which the data transfer control device operates as a role of a host, and a state of a peripheral operation, in which the data transfer control device operates as a role of a peripheral,
wherein the transfer controller includes a host controller which transfers data as the host during the host operation and a peripheral controller which transfers data as the peripheral during the peripheral operation, and
wherein the plurality of pipe regions are allocated in the packet buffer during the host operation, and the host controller automatically transfers data between each of the allocated pipe regions and corresponding each of the endpoints.

10. The data transfer control device as defined in claim 2, further comprising:
a state controller which controls a plurality of states including a state of a host operation, in which the data transfer control device operates as a role of a host, and a state of a peripheral operation, in which the data transfer control device operates as a role of a peripheral,
wherein the transfer controller includes a host controller which transfers data as the host during the host operation and a peripheral controller which transfers data as the peripheral during the peripheral operation, and
wherein the plurality of pipe regions are allocated in the packet buffer during the host operation, and the host controller automatically transfers data between each of the allocated pipe regions and corresponding each of the endpoints.

11. The data transfer control device as defined in claim 3, further comprising:
a state controller which controls a plurality of states including a state of a host operation, in which the data transfer control device operates as a role of a host, and a state of a peripheral operation, in which the data transfer control device operates as a role of a peripheral,
wherein the transfer controller includes a host controller which transfers data as the host during the host operation and a peripheral controller which transfers data as the peripheral during the peripheral operation, and
wherein the plurality of pipe regions are allocated in the packet buffer during the host operation, and the host controller automatically transfers data between each of the allocated pipe regions and corresponding each of the endpoints.

12. The data transfer control device as defined in claim 4, further comprising:
a state controller which controls a plurality of states including a state of a host operation, in which the data transfer control device operates as a role of a host, and a state of a peripheral operation, in which the data transfer control device operates as a role of a peripheral,
wherein the transfer controller includes a host controller which transfers data as the host during the host operation and a peripheral controller which transfers data as the peripheral during the peripheral operation, and
wherein the plurality of pipe regions are allocated in the packet buffer during the host operation, and the host controller automatically transfers data between each of the allocated pipe regions and corresponding each of the endpoints.

13. The data transfer control device as defined in claim 1,
wherein data is transferred according to a Universal Serial Bus (USB) On-The-Go (OTG) standard.

14. Electronic equipment comprising:
the data transfer control device as defined in claim 1;
a device which performs output processing, fetch processing, or storage processing of data transferred through the data transfer control device and the bus; and
a processing unit which controls data transfer of the data transfer control device.

15. A data transfer control method for data transfer through a bus, the method comprising:
allocating a plurality of pipe regions in a packet buffer at a host operation, data transferred to and from each of a plurality of endpoints being stored in each of the pipe regions;
setting transfer condition information on data transfer between each of the pipe regions and each of the endpoints in a plurality of transfer condition registers; and automatically generating a transaction for each of the endpoints based on the transfer condition information set in the transfer condition registers and automatically transferring data between each of the pipe regions and corresponding each of the endpoints.

16. The data transfer control method as defined in claim 15, setting a total size of data transferred to and from each of the endpoints, a maximum packet size, and a data transfer direction in the transfer condition registers as the transfer condition information, and automatically transferring data of the total size between each of the pipe regions and corresponding each of the endpoints by using a packet with a payload of the maximum packet size in a direction specified by the transfer direction.

17. The data transfer control method as defined in claim 15, setting a transfer type of data transfer in the transfer condition registers as the transfer condition information, and automatically transferring data in each of the pipe regions by means of data transfer of the transfer type set in the transfer condition registers.

18. The data transfer control method as defined in claim 15, setting transfer ratio information between the pipe regions in the transfer condition registers as the transfer condition information, and automatically transferring data in each of the pipe regions at a transfer ratio set by the transfer ratio information.

19. The data transfer control method as defined in claim 15, setting a token issue interval for interrupt transfer in the transfer condition register as the transfer condition information, and automatically transferring a token packet for interrupt transfer at the token issue interval set in the transfer condition registers.

20. The data transfer control method as defined in claim 15, controlling a plurality of states including a state of a host operation, in which a data transfer control device operates as a role of a host, and a state of a peripheral operation, in which a data transfer control device operates as a role of a peripheral, transferring data as the host during the host operation, transferring data as the peripheral during the peripheral operation, allocating the plurality of pipe regions in the packet buffer during the host operation, and automatically transferring data between each of the allocated pipe regions and corresponding each of the endpoints.

* * * * *